(12) United States Patent
Ninan et al.

(10) Patent No.: US 11,409,115 B2
(45) Date of Patent: *Aug. 9, 2022

(54) MODULAR AND DETACHABLE WEARABLE DEVICES FOR AR/VR/MR

(71) Applicant: DOLBY LABORATORIES LICENSING CORPORATION, San Francisco, CA (US)

(72) Inventors: Ajit Ninan, San Jose, CA (US); Neil Mammen, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,422

(22) Filed: Jun. 14, 2021

(65) Prior Publication Data

US 2021/0373346 A1 Dec. 2, 2021

Related U.S. Application Data

(63) Continuation of application No. 16/123,275, filed on Sep. 6, 2018, now Pat. No. 11,036,055.

(Continued)

(30) Foreign Application Priority Data

Dec. 4, 2017 (EP) .................................... 17205123

(51) Int. Cl.
*G02B 27/01* (2006.01)
*G06F 1/16* (2006.01)
(Continued)

(52) U.S. Cl.
CPC ......... *G02B 27/0176* (2013.01); *G06F 1/163* (2013.01); *G06F 1/1656* (2013.01);
(Continued)

(58) Field of Classification Search
CPC ........ G02B 27/0176; G02B 2027/0161; G02B 2027/0178; G02B 2027/0154;
(Continued)

(56) References Cited

U.S. PATENT DOCUMENTS 5,796,374 A 8/1998 Cone
6,480,174 B1 11/2002 Kaufmann
(Continued)

FOREIGN PATENT DOCUMENTS

CN 106840205 B 5/2020
DE 10159883 B4 2/2010
(Continued)

*Primary Examiner* — Rodney Amadiz

(57) ABSTRACT

A wearable device for augmented media content experiences can be formed with a mountable physical structure that has removably mountable positions and component devices that are removably mounted through the removably mountable positions. The component devices can be specifically selected based on a specific type of content consumption environment in which the wearable device is to operate. The mountable physical structure may be subject to a device washing process to which the component devices are not subject to, after the wearable device including the mountable physical structure and the component devices is used by a viewer in a content consumption session in the specific type of content consumption environment, so long as the component devices are subsequently removed from the mountable physical structure.

20 Claims, 11 Drawing Sheets

Related U.S. Application Data

(60) Provisional application No. 62/556,915, filed on Sep. 11, 2017.

(51) Int. Cl.
    *G06F 3/01* (2006.01)
    *G06T 19/00* (2011.01)

(52) U.S. Cl.
    CPC ...... *G06F 3/013* (2013.01); *G02B 2027/0161* (2013.01); *G02B 2027/0178* (2013.01); *G06T 19/006* (2013.01)

(58) Field of Classification Search
    CPC ........ G06F 1/163; G06F 3/013; G06F 1/1656; G06F 3/011; G06T 19/006
    See application file for complete search history.

(56) References Cited

U.S. PATENT DOCUMENTS

| | | | |
|---|---|---|---|
| 6,683,584 B2* | 1/2004 | Ronzani | G02B 27/017 345/8 |
| 8,179,604 B1 | 5/2012 | Prada Gomez | |
| 8,830,142 B1 | 9/2014 | Kim | |
| 10,146,067 B2* | 12/2018 | Tsai | G02B 27/0172 |
| 11,036,055 B2* | 6/2021 | Ninan | G06F 1/1656 |
| 11,163,166 B1* | 11/2021 | Ebert | G02B 27/0176 |
| 2004/0008158 A1* | 1/2004 | Chi | G02B 27/0176 345/8 |
| 2012/0013984 A1 | 1/2012 | Ikeda | |
| 2012/0038663 A1 | 2/2012 | Gustafsson | |
| 2013/0176626 A1 | 7/2013 | Heinrich | |
| 2014/0204021 A1 | 7/2014 | Sugihara | |
| 2014/0267941 A1 | 9/2014 | Ellsworth | |
| 2015/0193949 A1 | 7/2015 | Katz | |
| 2015/0234189 A1 | 8/2015 | Lyons | |
| 2015/0323797 A1 | 11/2015 | Ellsworth | |
| 2016/0021358 A1 | 1/2016 | Yang | |
| 2016/0025978 A1 | 1/2016 | Mallinson | |
| 2017/0031435 A1 | 2/2017 | Raffle | |
| 2017/0045746 A1 | 2/2017 | Ellsworth | |
| 2017/0308159 A1 | 10/2017 | Yoon | |
| 2018/0081178 A1 | 3/2018 | Shpunt | |
| 2018/0120573 A1 | 5/2018 | Ninan et al. | |
| 2018/0293752 A1 | 10/2018 | Ninan et al. | |
| 2018/0295351 A1 | 10/2018 | Ninan | |
| 2021/0173217 A1* | 6/2021 | Faul | G02B 5/3025 |
| 2021/0208408 A1* | 7/2021 | Boger | H05K 7/20954 |

FOREIGN PATENT DOCUMENTS

| | | |
|---|---|---|
| JP | 1175223 | 3/1999 |
| JP | 2005070554 A | 3/2005 |
| WO | 2011115917 | 9/2011 |
| WO | 2014082023 | 5/2014 |
| WO | 2016154827 | 10/2016 |
| WO | 2017132862 | 8/2017 |

* cited by examiner

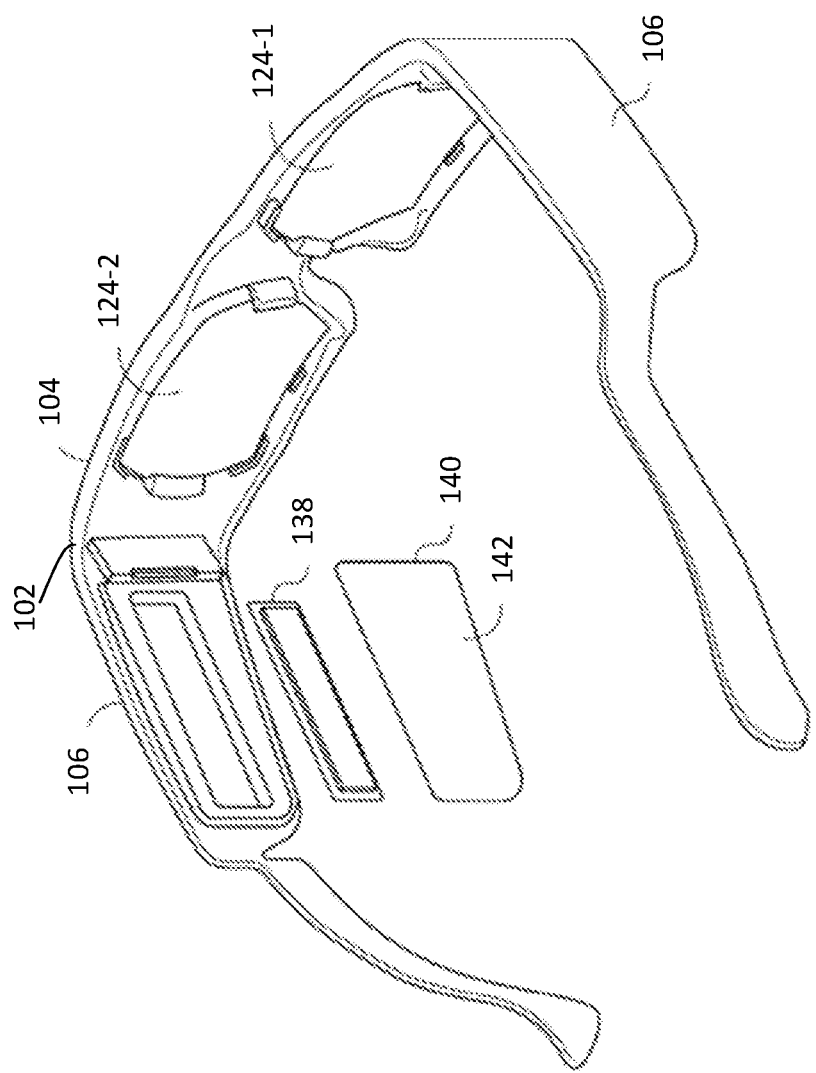

MODULAR AND DETACHABLE WEARABLE DEVICES FOR AR/VR/MR

CROSS REFERENCE TO RELATED APPLICATIONS

This application is a continuation of U.S. patent application Ser. No. 16/123,275 filed Mar. 14, 2019, which claims priority to the U.S. Provisional Application No. 62/556,915, filed Sep. 11, 2017 and European Patent Application No. 17205123.7, filed Dec. 4, 2017, both of which are incorporated by reference herein.

TECHNOLOGY

The present invention relates generally to display systems, and in particular, to modular and detachable wearable devices for augmented reality (AR), virtual reality (VR), mixed reality (MR), and so forth.

BACKGROUND

A wearable device that supports AR, VR, MR, and so forth, can be used by a viewer to blend virtual objects depicted in images on a device display with physical objects in a physical environment, or with other virtual objects depicted in other images on a different display such as a cinema display, a television, and so forth. To provide the viewer a natural and seamless user experience, the wearable device may integrate a large number of delicate and sophisticated electric and optical components at a great cost into an overall system of a form factor suitable for wearing.

To be used in mass entertainment venues such as cinemas the wearable devices would be subject to stringent laws and industry guidelines that regulate how these devices should be cleaned. As the wearable devices contain many sensitive electric and optical components, harsh device washing processes in compliance with the laws and industry guidelines would likely damage and degrade these wearable devices through liquids, chemical agents, high pressures and violent movements used in the device washing processes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A through FIG. 2F illustrate example wearable devices;

DESCRIPTION OF EXAMPLE EMBODIMENTS

Figure 1:
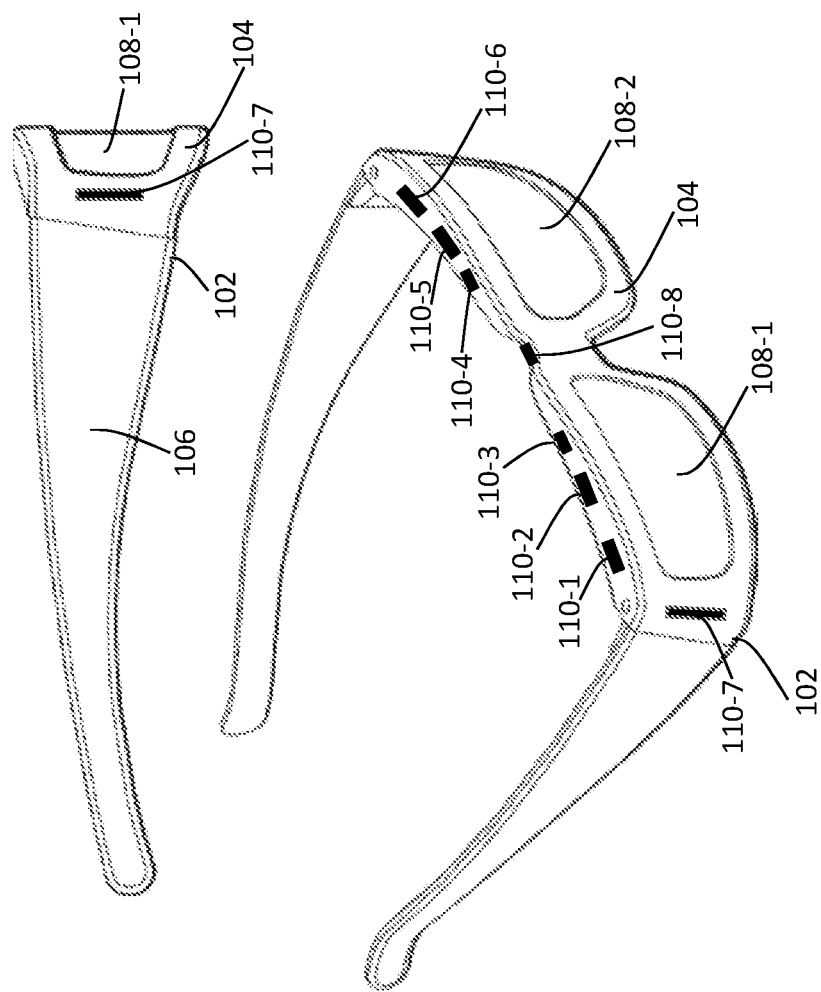
FIG. 1 illustrates side and perspective views of an example mountable physical structure.

Example embodiments, which relate to modular and detachable wearable devices for augmented reality (AR), virtual reality (VR), mixed reality (MR), and so forth, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. WASHABLE AND NON-WASHABLE COMPONENTS
3. MOUNTABLE PHYSICAL STRUCTURE
4. WEARABLE DEVICES WITH OUTSIDE-IN TRACKING
5. WEARABLE DEVICES WITH INSIDE-OUT TRACKING
6. WEARABLE DEVICES WITH EYE TRACKING
7. ADDITIONAL EXAMPLES
8. DEVICE CALIBRATION
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

A wearable device as described herein may be formed by modular and detachable component devices to support VR, AR, MR, and so forth. Some or all of the component devices can be attached to and removed from the wearable device by way of removably mountable positions on a mountable physical structure used to form the wearable device. Additionally, optionally or alternatively, any, some or all of the component devices can be used individually, in specific component device combinations, or in different wearable devices. Additionally, optionally or alternatively, any, some or all of the component devices may be cleaned jointly or separately.

In some embodiments, the wearable device may be an AR headset that comprises imagers to access media content that is location based or that is made available in conjunction with other images provided in an overall augmented cinema experience.

For example, the imagers may be used to provide location dependent or location independent content that could be complementary to a physical scene.

Additionally, optionally or alternatively, to augment cinema 3D experience, passive optical systems or passive optical stacks may be incorporated (e.g., mounted, clipped on, built, etc.) into the wearable devices for separating 3D color images rendered on a cinema display. The imagers may be used to provide additional media content that could be complementary to a depicted scene in the 3D color images.

Modularity and detachability of component devices allows flexible combinations to be made for different content consumption environment. Instead of making a single monolithic powerful and expensive device that is suitable for all content consumption environments, different wearable devices or a wearable device with different combinations of component devices optimized for specific content consumption environments can be respectively made in the field by viewers or cinema operators. As a result, wearable devices can be made with less weight and waste (e.g., by including only component devices that would be used in a specific content consumption environment, etc.).

A wearable device may be specifically designed to make parts of the wearable device that are to be in (e.g., substantial from the point of view of the governing laws and regulations as to require relatively harsh washing, etc.) physical contact with hair, skin or fluid of a viewer as separate modular and detachable component device(s) that can be removed at the end of a content consumption session for washing. Such separate modular and detachable component device(s) may include, but not necessarily limited to only, any, some, or all of: the physical structure that provides the removably mountable positions, optical components hermetically or substantially insulated from physical contact, electronic components hermetically or substantially insulated from physical contact, etc.

In contrast, electronic and optical parts that can be cleaned with light cleaning such as a simple wipe down or that are not required for relatively harsh device washing can be placed in modular and detachable component device(s) that have no or insignificant physical contact with hair, skin or fluid of a viewer. Such separate modular and detachable component device(s) may include, but not necessarily limited to only, any, some, or all of: imaging devices, media streaming devices, location and mapping devices, electronic devices other than plug-in media storage and audio devices (e.g., flash drives, USB drives, earbuds, earphones, clip-on microphones, etc.), etc.

Given stringent laws and guidelines for cleaning devices used in a public venue such as a cinema, a single monolithic device would include many electronic and optical parts, and would cost too much to be washed in relatively harsh device washing, thereby making such a device not viable commercially in mass entertainment venues. Modular and detachable designs used in forming wearable devices as described herein can be used to avoid making such monolithic devices and to avoid washing delicate electronic and optical parts, thereby making augmented cinema experiences that incorporate AR displays commercially viable.

AR or VR tracking systems can also be implemented based at least in part on modular and detachable component devices. For example, in outdoor use, an inside-out tracking device such as a simultaneous location and mapping (SLAM) device can be attached to the wearable device. In indoor use, where external device tracking such as those based on laser scanning and device image capturing is available, the SLAM device may be removed to significantly reduce the bulkiness and weight of the wearable device. Simple IR light sources or light retroreflectors can be disposed on the wearable device for external device tracking (or outside in tracking) to acquire images of the light sources and retroflectors, determine locations of the light sources or retroflectors, and generate 3D location and mapping data for the wearable device to use in AR or VR.

Modularity and flexible designs as provided by these techniques can make these AR or VR system commercially and operationally viable for many content consumption environments not necessarily limited to augmented entertainment experiences in cinemas. Rather than chasing after a single powerful system for all use cases or all content consumption environments, wearable devices can be adapted to these use cases and content consumption environments in the field by end users or operators in a flexible manner. The end users or operators can decide whether or when they would like to acquire specific component devices for respective use cases or respective content consumption environments.

As component devices can be attached and removed from a wearable device through removably mountable positions, these component devices may be positioned and/or oriented with locational error margins (or locational tolerances) caused by slight movements or inaccuracies associated with the removably mountable positions or the actual attachment operations.

At the beginning of and/or throughout a VR/AR/MR session, device calibration may be performed to generate non-factory calibration offsets. The non-factory calibration offsets may be used to replace or combine with factory-set calibration offsets into overall calibration offsets to be used for actual device operations in the wearable device.

A process flow for device calibration may be carried out based on a master-agent model or a peer-to-peer model. The role of a device calibration controller may be statically assigned to (or implemented by) a specific type of component device or dynamically assigned to a specific component device, for example through device negotiation protocol operations, through device election protocol operations, through device discovery protocol operations, by the time order in device attachment times, by the numerical order in device-related IDs, and so forth.

Component devices of a wearable device may be calibrated independently or autonomously, for example in parallel or in any order. Additionally, optionally or alternatively, component devices may be calibrated in a sequence.

For example, if component devices A and B both are present in the wearable device and if component device A depends on component device B (e.g., an imager depending on gaze tracker for viewing directions, a gaze tracker depending on a SLAM device or an external device tracker for coordinate values, etc.), then the component device that is depended on, in the present example component device B, may be calibrated first, followed by the component device that depends on the other component device. In some embodiments, the SLAM device or the external device tracker may be calibrated before the gaze tracker. In a cinema in which outside-in device tracking is performed by an external device tracker, the external device tracker may be calibrated and/or registered before all wearable devices and (additionally, optionally or alternatively) may be further calibrated and/or registered.

Component devices may be calibrated cooperatively together for example in a peer-to-peer model. Available device calibration results or default calibration parameters may be exchanged through the controller or from peer to peer. Calibration offsets generated in device calibration may be cached or stored in memory (e.g., registers, cache memory, RAM, ROM, flash memory, etc.).

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Washable and Non-Washable Components

A wearable device as described herein can be used in a wide variety of display applications related to AR, VR, MR, and so forth. Example wearable devices include, but are not necessarily limited to only, one or more of: an image projector, an AR display, a HoloLens display, a Magic Leap display, a Mixed Reality (MR) display, a tensor display, a volumetric display, a light field (LF) display, an Immy display, a Meta display, a relatively simple pair of AR glasses, etc. Example wearable devices and device displays can be found in U.S. Provisional Patent Application No. 62/484,157, with an application title of "AUGMENTED 3D ENTERTAINMENT SYSTEMS" by Ajit Ninan and Neil Mammen, filed on Apr. 11, 2017, the entire contents of which are hereby incorporated by reference as if fully set forth herein.

The wearable device can adopt a modular and detachable design in which multiple component devices involved in these applications can be incorporated into or removed from a mountable physical structure (e.g., an eyeglass frame, etc.) to form the wearable device as a single physically unitary interconnected system. Such a wearable device can be used in some or all of a variety of content consumption environments such as mass entertainment venues, home-environments, and so forth.

While being worn by a viewer (e.g., a human user, etc.) in a content consumption session, the wearable device may be relatively stationary or fixed with respect to positions and/or orientations of the viewer (e.g., the viewer's head, etc.). Thus, when the viewer's head makes a motion, the wearable device co-moves with the viewer's head with no or little relative motion with the viewer's head.

A wearable device as described herein may be deployed with a combination of specific component devices at a public venue, such as a cinema, a museum, a classroom, an exhibition, a studio, etc., for use by multiple viewers at separate times. The combination of specific devices may be incorporated into the wearable device based on corresponding physical device attachment (or fitting) mechanisms provided on the physical structure of the wearable device. In a mass entertainment environment such as a cinema, the wearable device (e.g., cinema glasses mounted with specific component devices, etc.) may be worn on a first viewer's head in a first content consumption session at a first time, a second different viewer's head in a second content consumption session at a second different time, and so on.

The wearable device comprises two types of component devices in terms of device washability. The first type of the component devices in the wearable device are component devices that make relatively significant physical contact with the body (e.g., skin, eyebrow, hair, body fluid such as sweat and tear, etc.) of a viewer that wears the wearable device. The second type of the component devices in the wearable device are component devices that make no or relatively insignificant physical contact with the body of the viewer.

The component devices (e.g., the first type of component devices, etc.) that make significant physical contact with the viewer may be designed specifically to be washable. These component devices may not comprise any sensitive components (e.g., active electric components, active optical components, etc.). Additionally, optionally or alternatively, these component devices may comprise sensitive components that are protected in physical housings from being damaged in device washing processes.

As used herein, the term "washable" may refer to a type of component device that is liquid-resistant and that can be washed with liquid such as water, chemical agents such as industrial cleaning agents, device washing (e.g., manual, machine, etc.) processes, pressures and movements exerted in device washing processes, and so forth. A device washing process as described herein may be used to comply with laws and/or guidelines of relevant industry associations (e.g., Digital Cinema Initiatives or DCI, etc.) to prevent communicable diseases such as pink eye and/or to remove body fluids (or fluid residues) left on a component device as described herein after a content consumption session.

A component device (e.g., the first component device type, etc.) that makes significant physical contact with a viewer may not comprise any electrically active components such as battery, electric power components, etc. Additionally, optionally or alternatively, the component device may contain electrically active components, but these electrically active components are specifically enclosed or hermetically sealed in a device washing process so that the components are protected from damage in the device washing process.

Similarly, a component device that makes significant physical contact with the viewer may not comprise any optically active components such as laser sources, active light emitters, etc. Additionally, optionally or alternatively, the component device may contain optically active components, but these optically active components are specifically enclosed or hermetically sealed in a device washing process so that the components are protected from damage in the device washing process.

The component devices (e.g., the second type of component devices, etc.) that make no or insignificant physical contact with the viewer may be designed specifically to be not washable or only lightly washable. These component devices may comprise sensitive components (e.g., active electric components, active optical components, etc.). Additionally, optionally or alternatively, these component devices may comprise sensitive components that would be damaged if exposed to or subject to a device washing process that is used to wash a washable component device.

As used herein, the term "not washable" or "lightly washable" may refer to a type of component device that may not be liquid-resistant, that cannot be washed in relatively harsh device washing process, or that can only be washed in less harsh washing such as with a physical wipe from a cleaning cloth used by a viewer or a service provider.

A component device that makes no or insignificant physical contact with the viewer may comprise electrically active components such as battery, electric power components, etc. Additionally, optionally or alternatively, such a component device may contain electrically active components that may or may not be enclosed or hermetically sealed if exposed to or subject to a device washing process that is used to wash a washable component device.

Similarly, a component device that makes no or insignificant physical contact with the viewer may comprise optically active components such as laser sources, active light emitters, etc. Additionally, optionally or alternatively, such a component device may contain optically active components that may or may not be enclosed or hermetically sealed if exposed to or subject to a device washing process that is used to wash a washable component device.

Each of some or all of component devices that form a wearable device as described herein may be modular and detachable from a mountable physical structure that is used to mount component devices for forming a physically unitary interconnected system.

Techniques as described herein can be used to obviate any need for making a single monolithic expensive device for each of multiple different types of content consumption environments. Instead of making and using a single monolithic and expensive device that may be suitable for many different types of content consumption environments and that may be under-engineered or over engineered for any specific content consumption environment, under the techniques as described herein, different combinations of specific component devices can be made by a viewer or operator (e.g., in the field, at runtime, right before or during an AR/VR/MR session, etc.) to suite different content consumption environment by adding/mounting or removing/detaching different component devices from the mountable physical structure depending on what is the actual content consumption environment (or actual content consumption environment type). As used herein, the term "content consumption environment" refers to a physical environment or an entertainment venue in which media content relating to AR, VR, MR, etc. can be consumed by way of a wearable device.

3. Mountable Physical Structure

FIG. 1 illustrates side and perspective views of an example mountable physical structure 102. Mountable physical structure 102 serves as a support member onto which one or more component device can be removably mounted to form a wearable device that is suitable for a particular display application, for a particular content consumption environment, and so forth. Mountable physical structure 102 may be of a regular or irregular shape, a skeleton shape, an interconnected shape, a contiguous shape, a shape with one or more area voids or volume voids, a shape with physical notches, physical key patterns, etc.

In some embodiments, mountable physical structure 102 may be of a shape that is rigidly set while in a content consumption session in which a wearable device formed with mountable physical structure 102 is used to consume media content. In some embodiments, mountable physical structure 102 may be of a shape that is (e.g., at least partly, etc.) foldable or otherwise deformable while not in such a content consumption session.

By way of example but not limitation, mountable physical structure 102 represents an eyeglass frame that comprises a frame front 104, temples 106, etc. Front frame 104 may comprise two spatial voids 108-1 and 108-2 in which a right view optical stack and a left view optical stack may be fit in permanently, or may be removably mounted. In some embodiments, spatial voids 108-1 and 108-2 are respectively permanently or removably fitted with electrooptical stacks such as lenses and other electrooptical components. In some embodiments, spatial voids 108-1 and 108-2 may represent additional removably mountable positions of mountable physical structure 102.

Mountable physical structure 102 may comprise one or more removably mountable positions 110-1 through 110-8 as illustrated in FIG. 1. These removably mountable positions may be distributed in various parts (e.g., temples 106, etc.) of mountable physical structure not necessarily limited to only front frame 104.

A removably mountable position refer to a specific portion or part of mountable physical structure 102 used to mount (e.g., pop in, etc.) on or remove (e.g., pop out, etc.) from, mountable physical structure 102, a component device with an attaching member that is mechanically or non-mechanically (e.g., magnetically, etc.) compatible with the removably mountable position for component device mounting or removing operations.

For example, the removably mountable position may, but is not limited to, be a specifically shaped recessive or protrusive receptacle for (e.g., rigidly, securely, neatly, tightly, within a minimum error used for attachment and removal, etc.) mounting (e.g., fitting, attaching, etc.) one or more types of component devices. These component devices may have correspondingly shaped protrusive or recessive insertion members each of which matches the specifically shaped recessive or protrusive receptacle of the removably mountable position. Additionally, optionally or alternatively, these component devices may have compatible attaching and detaching members (e.g., clip-on mechanisms, etc.) that are mechanically or non-mechanically (e.g., magnetically, etc.) compatible with the removably mountable position for component device mounting or removing operations. Additionally, optionally or alternatively, when operating with vision applications such as AR, VR, MR applications, these component devices may be securely attached at the removably mountable position with relatively high spatial precision (e.g., in terms of position and/or orientation, etc.) to mountable physical structure 102, for example through one or more of locking mechanisms, magnets, mating shapes, springs, and so forth.

Removably mountable positions as described herein may be shaped with or equipped with their respective key patterns (as formed or implemented with specific physical shapes). For example, a specific key pattern of a removably mountable position as described herein may accept only specifically shaped insertion members of specific component devices for mounting, but reject (e.g., all, etc.) other shaped insertion members of other component devices.

Left-side component devices, not the right-side component devices, may be allowed to insert into the left side of mountable physical structure 102, through matching left-side specifically shaped insertion members of the left-side component devices and left-side specific key patterns of left-side mountable positions of mountable physical structure 102.

Conversely, right-side component devices, not the left-side component devices, may be allowed to insert into the right side of mountable physical structure 102, through matching right-side specifically shaped insertion members of the right-side component devices and right-side specific key patterns of right-side mountable positions of mountable physical structure 102.

In some embodiments, mountable physical structure 102 itself without any mounted devices may comprise no electric components. In some embodiments, mountable physical structure 102 itself without any mounted devices may comprise no active electric components, but may comprise, or may be embedded with, passive electric components such as metallic (e.g., aluminum, gold, copper, metallic alloy, etc.) or non-metallic (e.g., thin film based, rare-earth-element based, graphene based, nanotube based, etc.) electrically conductive interconnects, for example between or among some or all of removably mountable positions 110-1 through 110-8.

In some embodiments, mountable physical structure 102 itself without any mounted devices may comprise no optical components. In some embodiments, mountable physical structure 102 itself without any mounted devices may comprise no active optical components, but may comprise, or may be embedded with, passive optical components such as lenses, mirrors, waveguides, and so forth, for example for receiving, redirecting, or injecting light rays from, to, or through one or more component devices attached at one or more of removably mountable positions 110-1 through 110-8.

In some embodiments, mountable physical structure 102 itself without any mounted devices may comprise one or more of active electric components or active optical components. Some or all of these active components may be enclosed permanently (e.g., hermetically sealed, prevented from contact with washing liquid or chemical agent in device washing processes, etc.) in device washing processes and/or in content consumption sessions. Additionally, optionally or alternatively, some or all of these active components may be enclosed temporarily (e.g., a disposable or removable cover, a disposable or removable case, etc.), to prevent these components from contact with washing liquid or chemical agent in device washing processes and/or from contact with hair, skin, body parts or bodily fluids of viewers in content consumption sessions. For example, a wash-sensitive component device may be placed in a temporary disposable cover, leaving only an attachment portion exposed to be inserted into mountable physical structure 102. Because of the temporary disposable cover, a viewer may be prevented from making significantly enough physical contact with the component device to incur a relatively harsh device washing process to wash the component device.

4. Wearable Devices with Outside-In Tracking

Figure 2A:
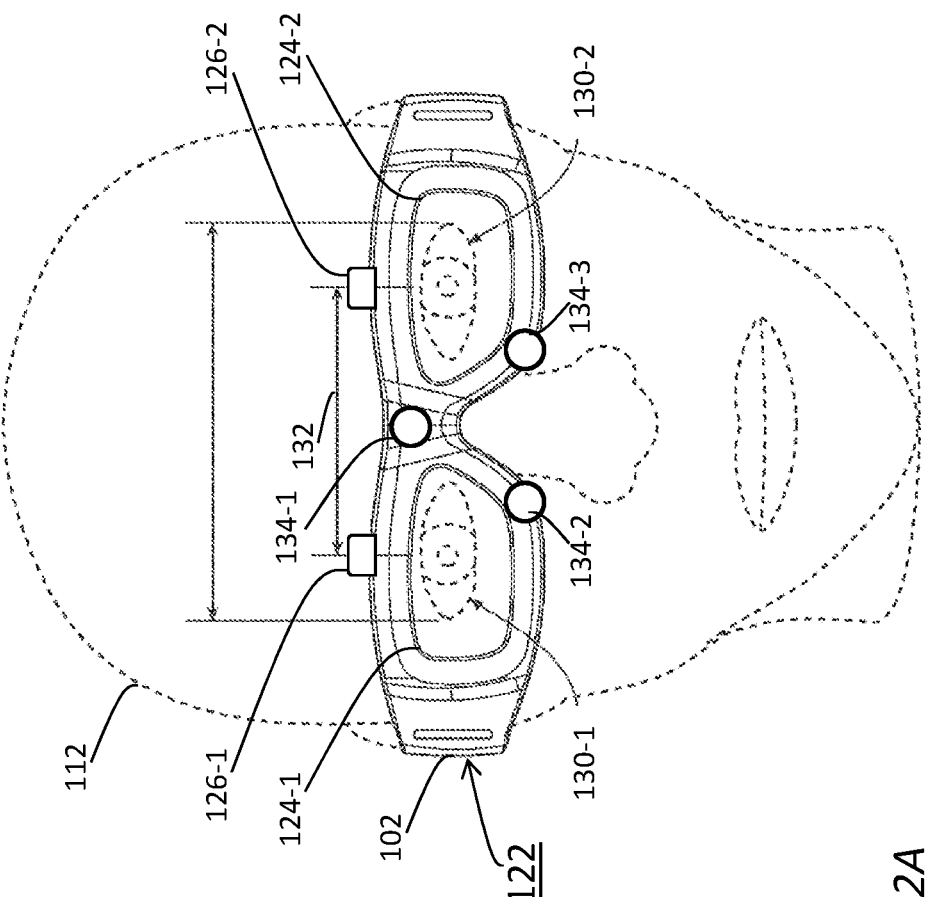

FIG. 2A illustrates an example wearable device 122 that may be formed by one or more modular and detachable component devices removably mounted on a mountable physical structure (e.g., 102 of FIG. 1, etc.). In some embodiments, wearable device 122 comprises a right view optical stack 124-1, a left view optical stack 124-2, a right view imager 126-1, a left view imager 126-2, one or more light sources 134-1, 134-2, 134-3, etc.

Some or all of the components/devices as depicted in FIG. 2A may be implemented by one or more mechanical components, one or more electrooptical components, one or more computing devices, modules, units, etc., in software, hardware, a combination of software and hardware, etc. Some or all of the components/devices as depicted in FIG. 2A may be communicatively (e.g., wirelessly, inductively, in an ad hoc network, in a network formed by using one or more device sensing and/or discovery protocols, with wired connections, etc.) coupled with some other components/devices as depicted in FIG. 2A or with other components/devices not depicted in FIG. 2A.

In some embodiments, a wearable device as described herein is worn or mounted on the head of a viewer 112. The wearable device (e.g., 122, etc.) may represent or include one or more of: an eyeglasses frame, a headset, a wearable peripheral for mobile phones, a face shield, a helmet, a strap attachment, a bracelet, a watch band, a headwear, etc. The eyeglass frame may be personalized to an individual viewer or may be of a generic size designed to be worn or mounted by a relatively large population of viewers (e.g., full size, a size for kids, etc.). By way of example but not limitation, an eyeglass frame is used to (e.g., removably, irremovably, etc.) fit right view optical stack 124-1 and left view optical stack 124-2 in front of the right eye 130-1 and the left eye 130-2 of a viewer 112, respectively.

Additionally, optionally or alternatively, the eyeglass frame is used to (e.g., removably, irremovably, etc.) attach or mount right view imager 126-1 and left view imager 126-2, for example, on a top rim of the eyeglass frame. Additionally, optionally or alternatively, the eyeglass frame is used to (e.g., removably, irremovably, etc.) attach or mount SLAM device 128, for example, on a top bar of the eyeglass frame.

Right view optical stack 124-1 can be used by viewer 112 of wearable device 122 to view right view images rendered on a cinema display or a non-cinema display. Left view optical stack 124-2 can be used by viewer 112 of wearable device 122 to view left view images rendered on the cinema or non-cinema display. Right view images as viewed by viewer 112 through right view optical stack 124-1 and left view images as viewed by viewer 112 through left view optical stack 124-2 form stereoscopic images.

Right view imager 126-1 can be used by viewer 112 to view right view display images rendered on a component device display virtually or physically created by right and left view imagers 126-1 and 126-2. Left view imager 126-2 can be used by viewer 112 to view left view device display images rendered on the component device display. Right view display images as viewed by viewer 112 through right view imager 126-1 and left view display images as viewed by viewer 112 through left view imager 126-2 form stereoscopic (component device) display images that may be complementary to the stereoscopic images as viewed by the same viewer 112 through right and left view optical stacks 124-1 and 124-2.

In some embodiments, the component device display is not a physical display, but rather an image plane or a virtual display created by light rays emitted by right view imager 126-1 and left view imager 126-2. More specifically, right view imager 126-1 emits right view light rays that reach right eye 130-1 of viewer 112 to allow viewer 112 to visually perceive or view the right view display images as if the right view display images are displayed at the component device display. Likewise, left view imager 126-2 emits left view light rays that reach left eye 130-2 of viewer 112 to allow viewer 112 to visually perceive or view the left view display images as if the left view display images are displayed at the component device display.

In some embodiments, the component device display 116 may be located at a depth different from or the same as that of the cinema or non-cinema display in reference to viewer 112. As used herein, the term "depth" may refer to a (e.g., front-view, etc.) spatial distance between a viewer and an image plane of a display (e.g., cinema or non-cinema display, device display, etc.).

In some embodiments, component device display 116 can display or project device display images at a single image plane of a single distance or at multiple image planes of multiple different distances (e.g., through time-division multiplexing, etc.) in front of the viewer. These distances of the image planes can be fixed or auto tunable.

For example, right view imager 126-1 and left view imager 126-2 may operate with lens elements (e.g., with fixed focal lengths, included in right view optical stack 124-1 and left view optical stack 124-2, etc.) to project right view (component device) display images and left view (component device) display images from an image plane (or the component device display) at a fixed depth to viewer 112.

In another non-limiting example, right view imager 126-1 and left view imager 126-2 may operate with lens elements (e.g., with fixed focal lengths, with variable focal lengths, included in right view optical stack 124-1 and left view optical stack 124-2, etc.) to project the right and left view (component device) display images from an image plane (or the component device display) at multiple fixed depths to viewer 112.

In some embodiments, a device image renderer that is operating in conjunction with, or that is implemented in, wearable device 122 or left and right view imagers 126-1 and 126-2 attached herein can generate the right and left view display images as a set of time sequential or time synchronous 3D images.

Example (component) cinema or non-cinema displays, device displays, image renders, and so forth, can be found in U.S. Provisional Patent Application No. 62/414,901, with an application title of "EYEWEAR DEVICES WITH FOCUS TUNABLE LENSES," filed on Oct. 31, 2016; U.S. Provisional Patent Application No. 62/484,157, with an application title of "AUGMENTED 3D ENTERTAINMENT SYSTEMS," filed on Apr. 11, 2017, the entire contents of which are hereby incorporated by reference as if fully set forth herein.

An electrooptical stack as described herein may comprise one or more optical and/or electrooptical component layers including but not limited to a combination of one or more of: light transmissive component layers, light reflective component layers, light filtering layers, light modulation layers, micro-prism layers, micro-lens layers, variable or fixed lenses, beam splitters, beam combiners, light engines, switching elements (e.g., transistor-based, etc.) to control levels of light transmittance (or transmissivity) or light reflectance (reflectivity), etc.

Right view optical stack 124-1 represents an electrooptical stack that allows right view light rays—from the cinema or non-cinema display—used to render the right view images on the cinema or non-cinema display to reach (or to be transmitted to) right eye 130-1 of viewer 112. Left view optical stack 124-2 represents an electrooptical stack that allows left view light rays—from the cinema or non-cinema display—used to render the left view images on the cinema or non-cinema display to reach (or to be transmitted to) left eye 130-2 of viewer 112. At runtime, right view optical stack 124-1 may be optically transparent to the right view light rays while the right view cinema display images are being rendered on the cinema or non-cinema display; and left view optical stack 124-2 may be optically transparent to the left view light rays while the left view images are being rendered on the cinema or non-cinema display.

Techniques as described herein can be used to support rendering and viewing 3D images with a wide variety of right/left eye separation technologies including but not limited to those based on anaglyph, linear polarization, circular polarization, shutter glasses, spectral spatial separation, etc. Any of the foregoing right/left eye separation technologies may be used in left and right view optical stacks 124-1 and 124-2 to allow light rays used for rendering the left view images and the right view images to respectively reach right and left eyes 130-1 and 130-2—or to respectively reach eye vision sweet spots (e.g., foveal vision) spatially separated by an interpupil distance 132—of viewer 112.

In some embodiments, right and left view optical stacks 124-1 and 124-2 may implement anaglyph 3D techniques for viewing the right and left view images rendered on the cinema or non-cinema display. Right and left view optical stacks 124-1 and 124-2 provide right/left eye separation by filtering the light (e.g., red light for rendering one image and cyan light for rendering the other image, etc.) through two color filters such as a red filter and a cyan filter.

In some embodiments, right and left view optical stacks 124-1 and 124-2 may implement linear polarization 3D techniques for viewing the right and left view images rendered on the cinema or non-cinema display. Right and left view optical stacks 124-1 and 124-2 provide right/left eye separation by filtering linearly polarized light (vertically polarized light for rendering one image and horizontally polarized light for rendering the other image) through two orthogonal linear polarizers such as a vertical polarizer and a horizontal polarizer.

In some embodiments, right and left view optical stack 124-1 and 124-2 may implement circular polarization 3D techniques for viewing the right and left view images rendered on the cinema or non-cinema display. Right and left view optical stacks 124-1 and 124-2 provide right/left eye separation by filtering circularly polarized light (right-handedly polarized light for rendering one image and left-handedly polarized light for rendering the other image) through two orthogonal circular polarizers such as a right-handed polarizer and a left-handed polarizer.

In some embodiments, right and left view optical stacks 124-1 and 124-2 may implement shutter glasses 3D techniques for viewing the right and left view images rendered on the cinema or non-cinema display. Right and left view optical stack 124-1 and 124-2 provide right/left eye separation by right/left eye shuttering (a first image displaying time interval for rendering one image and a second image displaying time interval for rendering the other image) through synchronizing time-multiplexed viewing of right and left eyes with time-multiplexed rendering of respective right and left images.

In some embodiments, right and left view optical stacks 124-1 and 124-2 may implement spectral spatial separation 3D techniques for viewing the left and right view images rendered on the cinema or non-cinema display. Right and left view optical stacks 124-1 and 124-2 provide right/left eye separation by filtering the light (e.g., a first set of red, green and blue light for rendering one image and a second set of red, green and blue light for rendering the other image where the first set of red, green and blue light is spectrally separated from the second set of red, green and blue light, etc.) through two spectral light filters (e.g., a first filter that passes the first set of red, green and blue light but rejects the second set of red, green and blue light and a second filter that passes the second set of red, green and blue light but rejects the first set of red, green and blue light, etc.).

In various embodiments, right and left view imagers 126-1 and 126-2 may use same or different left/right eye separation technologies for rendering the right and left view (component device) images, as compared with those for rendering the right and left view images.

In an example, wearable device 122 may comprise spatially separated right and left view imagers 126-1 and 126-2—for example located apart with approximately the interpupil distance 132—to project the right and left view (component device) display images to right and left eyes 130-1 and 130-2, respectively. In another example, wearable device 122 may comprise a central imager (e.g., mounted on a top bar of the eyeglass frame, etc.) to route or project the right and left view (component device) display images to right and left eye 130-1 and 130-2, respectively.

Light sources 134-1 through 134-3 may be either removably or irremovably attached with one or more (e.g., mechanically, etc.) rigid parts (e.g., bridge, top bar, rim, etc.) of mountable physical structure 102. When viewer 112 is wearing wearable device 122, spatial positions of light sources 134-1 through 134-3 are stationary relative to wearable device 122 but may not be stationary relative to a 3D space in which viewer 112 or wearable device 122 is located because of the viewer's body or head movements.

A light source as described herein may have an attachment mechanism such as an insert tab, a keyed mechanical part, etc. that fits into a receptacle on mountable physical structure 102. In some embodiments, the attachment mechanism can securely fit into the receptacle, and cannot be easily or casually removed by a viewer (e.g., 112, etc.). In some embodiments, a light source as described herein may be permanently affixed to physical structure 102.

In various embodiments, none, some or all of light sources 134-1 through 134-3 may be light emitters (e.g., an LED light, an infrared light emitter, etc.) that emit light rays to be captured into device tracking images by a device tracker deployed in a physical environment in which viewer 112 or wearable device 122 is located. Additionally, optionally or alternatively, none, some or all of light sources 134-1 through 134-3 may be light reflectors that emit light rays to be captured into the device tracking images by the device tracker.

For example, in some embodiments, all of light sources 134-1 through 134-3 on wearable device 122 are light reflectors. The device tracker may comprise a laser scanner that emits a scanning laser beam (e.g., with light wavelengths invisible to human visual perception, etc.) to scan light sources of wearable devices (e.g., 122, etc.) present in the physical space. Light sources 134-1 through 134-3 on wearable device 122 may be retroreflectors (e.g., reflect incoming light rays back to the sender or a specific direction, etc.), scattering reflectors, etc., that receive incoming laser light rays of the scanning laser beam from the laser scanner and redirect/reflect these incoming light rays into reflected light rays toward the laser scanner. In some embodiments, light reflectors 134-1 through 134-3 may comprise light conversion materials such as quantum dots, etc., that converts received laser light rays into regenerated light rays. The reflected or regenerated light rays from light source 134-1 through 134-3 may focus or (optionally or alternatively) scatter onto the laser scanner, one or more light sensors operating in conjunction with the laser scanner, one or more image capturing devices operating in conjunction with the laser scanner, etc. The reflected or regenerated light rays from light sources 134-1 through 134-3 may be captured into device tracking images as described herein.

Additionally, optionally or alternatively, one or more radio-frequency (RF) tracking ID signals, one or more light tracking ID signals, etc., may be sent by a separate device (operating in conjunction with wearable device 122 installed at the seating space of the viewer of wearable device 122) and captured by one or more device ID sensors of the device tracker for the purpose of determining device ID information related to wearable device 122; the separate device may be stationary, removably or irremovably attached to the seat, etc.

In some embodiments, one of light sources 134-1 through 134-3 on wearable device 122 is selected or used as a light emitter while all the remaining light sources are light reflectors. By way of illustration but not limitation, light source 134-1 may be selected as a light emitter, which may comprise one or more of: LED lights, laser light emitters, light emitters with light conversion materials, etc. The remaining light sources (134-2 and 134-3) may be light reflectors, each of which may comprise one or more of: retroreflectors, scattering reflectors, etc. Light reflector 134-1 emits light rays that focus or (optionally or alternatively) scatter onto one or more tracking image sensors in the device tracker. In the meantime, light reflectors 134-2 and 134-3 receive incoming light rays from light source 134-1 and redirect/reflect these incoming light rays into reflected light rays. In some embodiments, light reflectors 134-2 and 134-3 may comprise light conversion materials such as quantum dots, etc., that converts received laser light rays into regenerated light rays. The reflected/regenerated light rays from light source 134-2 and 134-3 may focus or (alternatively, optionally or alternatively) scatter onto the tracking image sensors in the device tracker. The emitted light rays, reflected/regenerated light rays may be captured into device tracking images as described herein.

Additionally, optionally or alternatively, light rays from a light emitter as described herein may be digitally encoded with device ID information for the wearable device (102); at least a portion of digitally encoded light rays from the light emitter or light reflectors may be captured by one or more device ID sensors in the one or more tracking sensor assemblies (e.g., 124, etc.).

In some embodiments, a light emitter in light sources 134-1 through 134-3 of wearable device 122 may be electrically or opto-electrically coupled to a light emission controller that can control the light emitter to emit light rays that logically represent one or more device ID signals encoded with device ID information and optionally other information related to wearable device 122.

Example light sources, device tracking, and so forth, can be found in U.S. Provisional Patent Application No. 62/484,131, with an application title of "PASSIVE MULTI-WEARABLE-DEVICES TRACKING" by Ajit Ninan and Neil Mammen, filed on Apr. 11, 2017, the entire contents of which are hereby incorporated by reference as if fully set forth herein.

5. Wearable Devices with Inside-Out Tracking

Figure 2B:
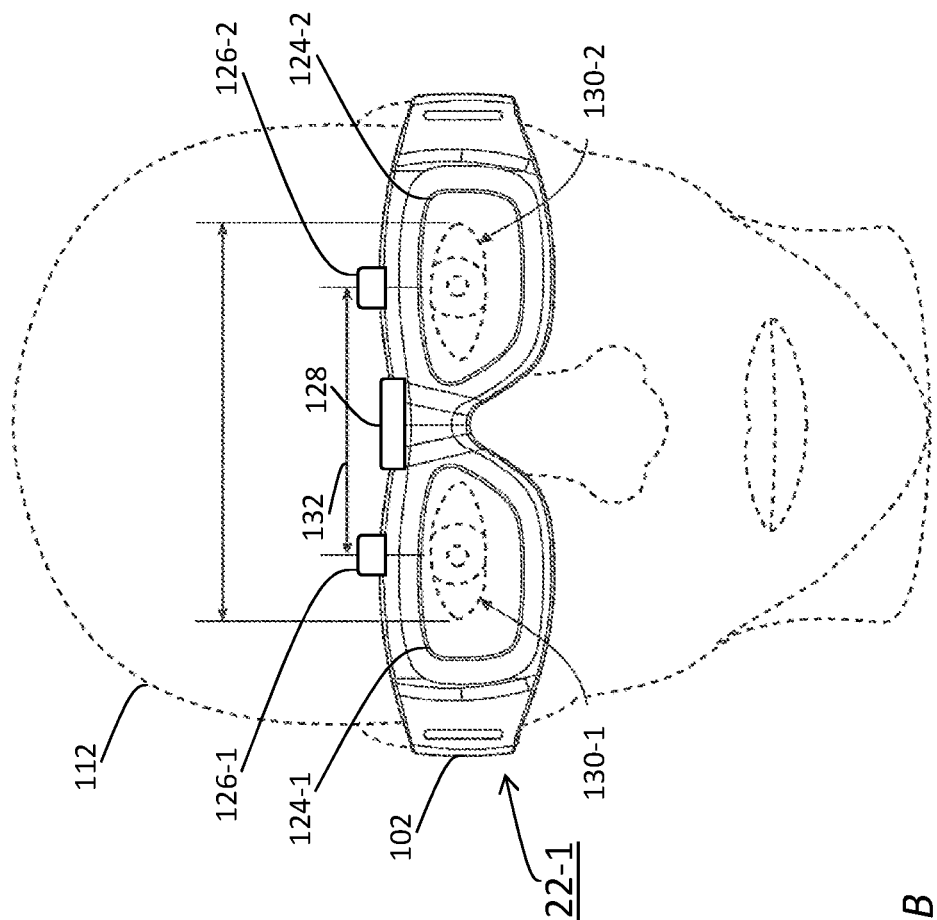

FIG. 2B illustrates an example wearable device 122-1 that may be formed by one or more modular and detachable component devices removably mounted on a mountable physical structure (e.g., 102 of FIG. 1, etc.). In some embodiments, wearable device 122-1 comprises a right view optical stack 124-3, a left view optical stack 124-4, a right view imager 126-1, a left view imager 126-2, a simultaneous location and mapping (SLAM) device 128, etc.

Some or all of the components/devices as depicted in FIG. 2B may be implemented by one or more mechanical components, one or more electrooptical components, one or more computing devices, modules, units, etc., in software, hardware, a combination of software and hardware, etc. Some or all of the components/devices as depicted in FIG. 2B may be communicatively (e.g., wirelessly, inductively, in an ad hoc network, in a network formed by using one or more device sensing and/or discovery protocols, with wired connections, etc.) coupled with some other components/devices as depicted in FIG. 2B or with other components/devices not depicted in FIG. 2B.

By way of example but not limitation, mountable physical structure 102 may be an eyeglass frame used to (e.g., removably, irremovably, etc.) fit right view optical stack 124-3 and left view optical stack 124-4 in front of the right eye 130-1 and the left eye 130-2 of a viewer 112, respectively.

Additionally, optionally or alternatively, the eyeglass frame is used to (e.g., removably, irremovably, etc.) attach or mount right view imager 126-1 and left view imager 126-2, for example, on a top rim of the eyeglass frame. Additionally, optionally or alternatively, the eyeglass frame is used to (e.g., removably, irremovably, etc.) attach or mount SLAM device 128, for example, on a top bar of the eyeglass frame.

Right view optical stack 124-3 and left view optical stack 124-4 can be used by viewer 112 of wearable device 122 to view the physical environment in which viewer 112 or wearable device 122-1 is located.

Right view imager 126-1 can be used by viewer 112 to view right view display images rendered on a component device display virtually or physically created by right and left view imagers 126-1 and 126-2. Left view imager 126-2 can be used by viewer 112 to view left view device display images rendered on the component device display. Right view display images as viewed by viewer 112 through right view imager 126-1 and left view display images as viewed by viewer 112 through left view imager 126-2 form stereoscopic (component device) display images that may depict objects and provide complementary information that is spatially registered or depicted at specific physical locations of the physical space as viewed by the same viewer 112 through right and left view optical stacks 124-3 and 124-4.

Right view imager 126-1 and left view imager 126-2 may operate with lens elements (e.g., with fixed focal lengths, included in right view optical stack 124-3 and left view optical stack 124-4, etc.) to project right and left view (component device) display images from an image plane (or the component device display) at a fixed depth to viewer 112.

In another non-limiting example, right view imager 126-1 and left view imager 126-2 may operate with lens elements (e.g., with fixed focal lengths, with variable focal lengths, included in right view optical stack 124-3 and left view optical stack 124-4, etc.) to project the right and left view (component device) display images from an image plane (or the component device display) at multiple fixed depths to viewer 112.

Right and left view optical stacks 124-3 and 124-4 represent electrooptical stacks that are optically transparent to light emanated from physical objects, persons, and so forth, present in the physical space.

SLAM device 128 may be used to construct or update a 3D map of a physical environment (e.g., a content consumption environment, a cinema, a home entertainment room, a venue, an amusement park, a tourist attraction, a museum, etc.) in which viewer 112 or wearable device 122 is located. SLAM device may comprise or operate with one or more image sensors (e.g., camera elements, etc.), locational and/or orientation sensors (e.g., GPS units, motion sensors, etc.), communication devices/interfaces (e.g., wirelessly, wired connection based, Wi-Fi, infrared, Bluetooth, laser based, LED based, etc.), and so forth. The image sensors may be used by SLAM device 128 to acquire images of the physical environment. The locational and/or orientation sensors may be used by SLAM device 128 to collect sensor data about the location and/or orientation at any given time point of viewer 112 or wearable device 122. The communication devices/interfaces may be used by SLAM device 128 to communicate with other component devices of wearable device 122, and communicate with cloud-based or premise-based servers (e.g., device image renderer(s) in the content consumption environment, media streaming server(s), mapping data server(s), server(s) performing SLAM algorithms or analyses, etc.) and/or computing systems that are external or remote to wearable device 122. In some embodiments, SLAM device 128 performs SLAM algorithms or analyses based on some or all of the images of the physical environment, the sensor data about the location and/or orientation, and map information cached in local data storage or received from external servers, and so forth, to simultaneously obtain the location (which may include both the position and the orientation) of viewer 112 or wearable device 122, and the map (e.g., 2D map, 3D map, etc.) of the physical environment within a strict time budget (e.g., less than one millisecond, one millisecond, five milliseconds, etc.) measured from the time the images and the sensor data were acquired. Additionally, optionally or alternatively, in some embodiments, a server remoted to SLAM device 128 may operate with SLAM device 128 to receive some or all of the images and/or sensor data and perform some or all of the SLAM algorithms or analyses.

6. Wearable Devices with Eye Tracking

Figure 2C:
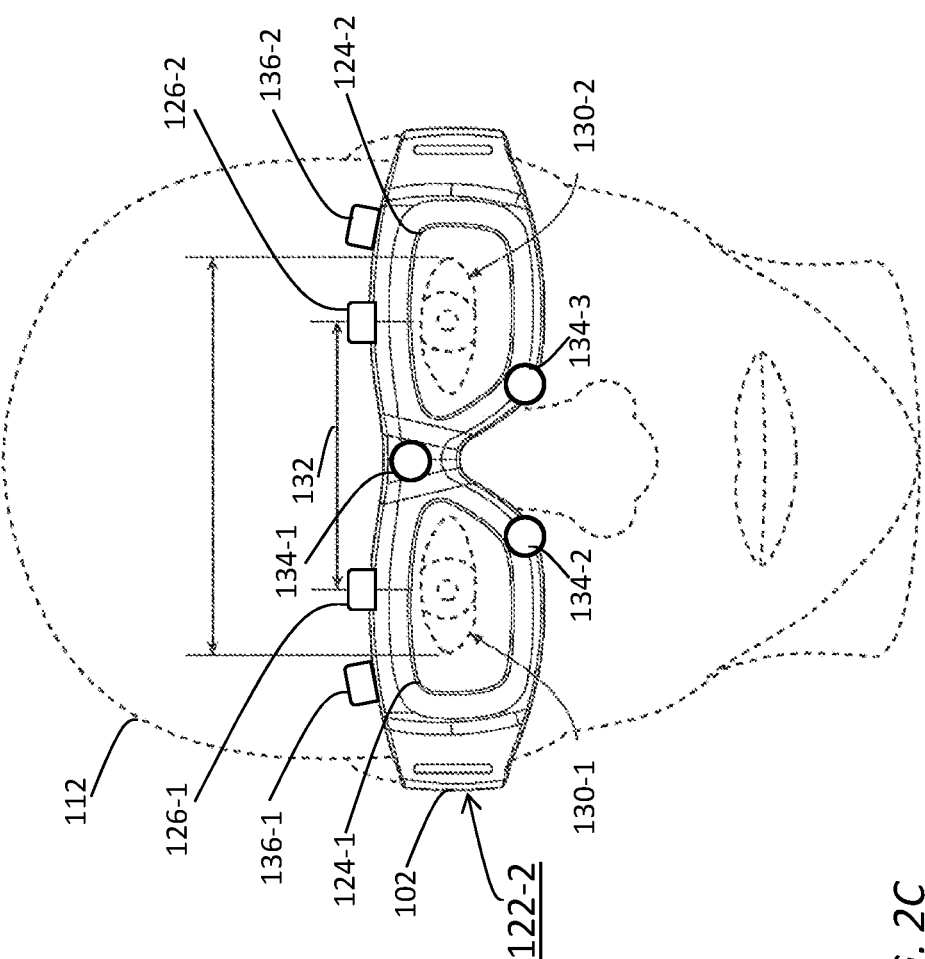
Figure 2D:
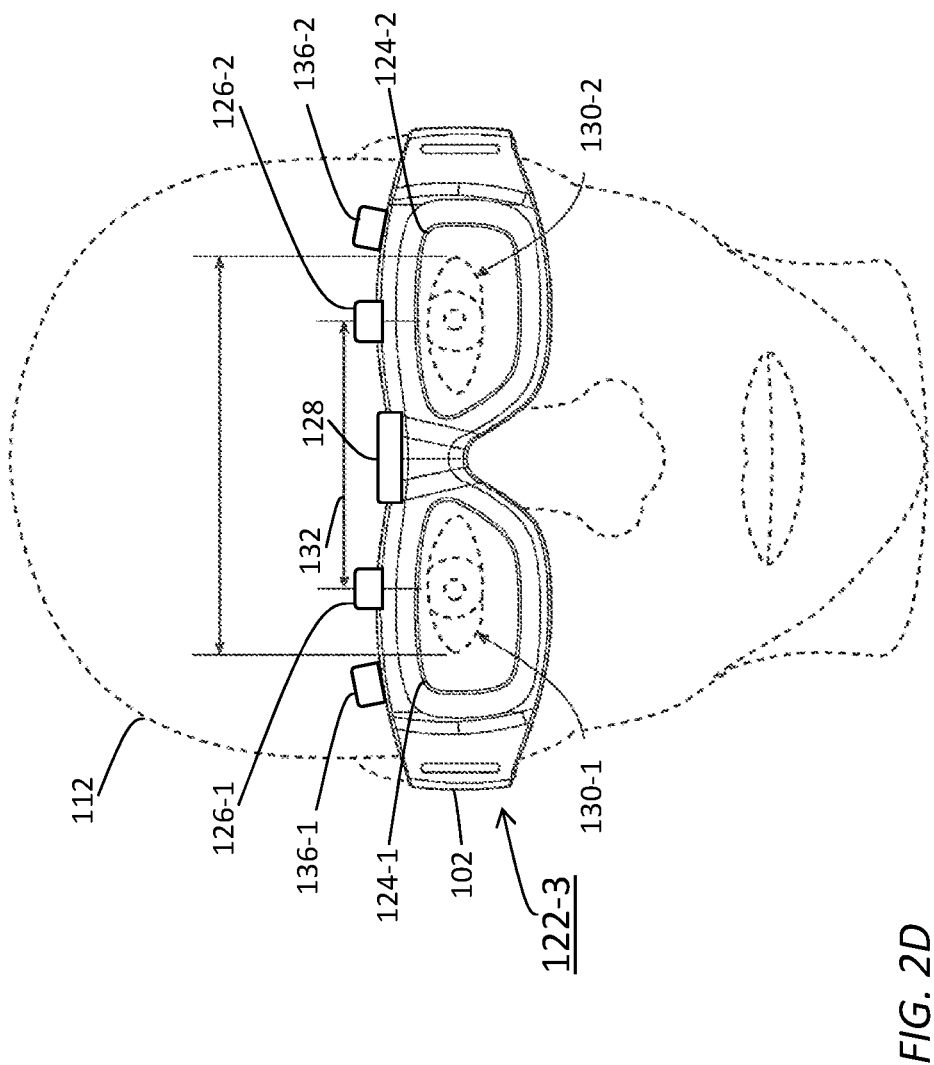

FIG. 2C and FIG. 2D illustrate example wearable devices 122-2 and 122-3 that may be formed by one or more modular and detachable component devices removably mounted on a mountable physical structure (e.g., 102 of FIG. 1, etc.).

As illustrated in FIG. 2C, wearable device 122-2 comprises component devices such as a right view optical stack 124-1, a left view optical stack 124-2, a right view imager 126-1, a left view imager 126-2, one or more light sources 134-1, 134-2, 134-3, etc., as illustrated in FIG. 2A; wearable device 122-2 further comprises a right gaze (or eye) tracker 136-1 and a left gaze (or eye) tracker 136-2.

As illustrated in FIG. 2D, wearable device 122-3 comprises a right view optical stack 124-3, a left view optical stack 124-4, a right view imager 126-1, a left view imager 126-2, a simultaneous location and mapping (SLAM) device 128, etc., as illustrated in FIG. 2B; wearable device 122-4 further comprises right gaze tracker 136-1 and left gaze tracker 136-2.

Some or all of the components/devices as depicted in each of FIG. 2C and FIG. 2D may be implemented by one or more mechanical components, one or more electrooptical components, one or more computing devices, modules, units, etc., in software, hardware, a combination of software and hardware, etc. Some or all of the components/devices as depicted in each of FIG. 2C and FIG. 2D may be communicatively (e.g., wirelessly, inductively, in an ad hoc network, in a network formed by using one or more device sensing and/or discovery protocols, with wired connections, etc.) coupled with some other components/devices as depicted in each of FIG. 2C and FIG. 2D or with other components/devices not depicted in each of FIG. 2C and FIG. 2D.

A gaze (or eye) tracker such as 136-1 or 136-2 of FIG. 2C and FIG. 2D represents a component device that is operated to track a gaze (or viewing) direction of an eye of viewer 112 at any given time in real time or in near real time. To track the movement and/or the gaze direction of the eye, the gaze tracker may implement one or more of: embedded mirror methods, embedded magnetic field sensor methods, videooculography methods, electrooculogram methods, infrared or near-infrared light-based pupil tracking methods, etc. The gaze device may comprise or operate with one or more image or non-image sensors, sensor data analyzers, communication devices/interfaces (e.g., wirelessly, wired connection based, Wi-Fi, infrared, Bluetooth, laser based, LED based, etc.), and so forth. The image and/or non-image sensors may be used by the eye tracker to acquire images and/or non-image sensor data of the eye or some or all parts of the eye such as iris, pupil, cornea, retinal blood vessels, and so forth. The sensor data analyzer may be used by the eye tracker to analyze the images and/or non-image sensor data to determine the gaze (or viewing) direction of the eye, for example within a strict time budget (e.g., less than one millisecond, one millisecond, five milliseconds, etc.) measured from the time the images and/or the sensor data were acquired. The communication devices/interfaces may be used by the gaze tracker to communicate with other component devices (including but not limited to a counterpart gaze tracker that is tracking a gaze or viewing direction of the other eye of viewer 112) of a wearable device (e.g., 122-2, 122-3, etc.), and communicate with cloud-based or premise-based servers (e.g., device image renderer(s) in the content consumption environment, media streaming server(s), etc.) and/or computing systems that are external or remote to the wearable device (e.g., 122-2, 122-3, etc.). Additionally, optionally or alternatively, in some embodiments, a server remoted to the gaze tracker may operate with the gaze tracker to receive some or all of the images and/or sensor data and to perform some or all of the gaze tracking algorithms or analyses.

7. Additional Examples

In some embodiments, a device image renderer (not shown) as described herein may be implemented a device separate from or may be implemented as a part of left and right view imagers 126-1 and 126-2. The device image renderer is communicatively coupled to some or all component devices of a wearable device (e.g., 122, 122-1, 122-2, etc.) as described herein; receives positional and directional (or orientation) data of the wearable device (e.g., 122, 122-1, 122-2, etc.) as tracked/monitored by a device tracker or by a SLAM device with the wearable device (e.g., 122, 122-1, 122-2, etc.); generates one or more (component device) display images for the wearable device (e.g., 122, 122-1, 122-2, etc.), based at least in part on the positional and directional data of the wearable device (e.g., 122, 122-1, 122-2, etc.); causes the display images to be rendered with left and right view imagers 126-1 and 126-2 of the wearable device (e.g., 122, 122-1, 122-2, etc.) on a component device display; etc. The device image renderer can communicate control information, status information, positional and directional data, image data such as the display images, metadata, etc., with left and right view imagers 126-1 and 126-2 of the wearable device (e.g., 122, 122-1, 122-2, etc.) and/or other local or remote devices over one or more data connections. Example data connections may include, but are not limited, wireless data connections, wired data connections, radiofrequency based data connections, cellular data connections, Wi-Fi data connections, infrared-based data connections, data connections over HDMI cable, data connections over optical cable, data connections over High-Speed Serial Interface (HSSI), High-Definition Serial Digital Interface (HD-SDI), 12G-SDI, USB cable, and the like.

Example (device) image renderers, cinema or non-cinema image rendering, (component device) display image rendering, and so forth, can be found in U.S. Provisional Patent Application No. 62/484,121, with an application title of "LAYERED AUGMENTED ENTERTAINMENT EXPERIENCES" by Ajit Ninan, Neil Mammen and Tyrome Brown, filed on Apr. 11, 2017; U.S. Provisional Patent Application No. 62/484,148, with an application title of "ADAPTING VIDEO IMAGES FOR WEARABLE DEVICES" by Ajit Ninan and Neil Mammen, filed on Apr. 11, 2017, the entire contents of which are hereby incorporated by reference as if fully set forth herein.

Figure 2E:
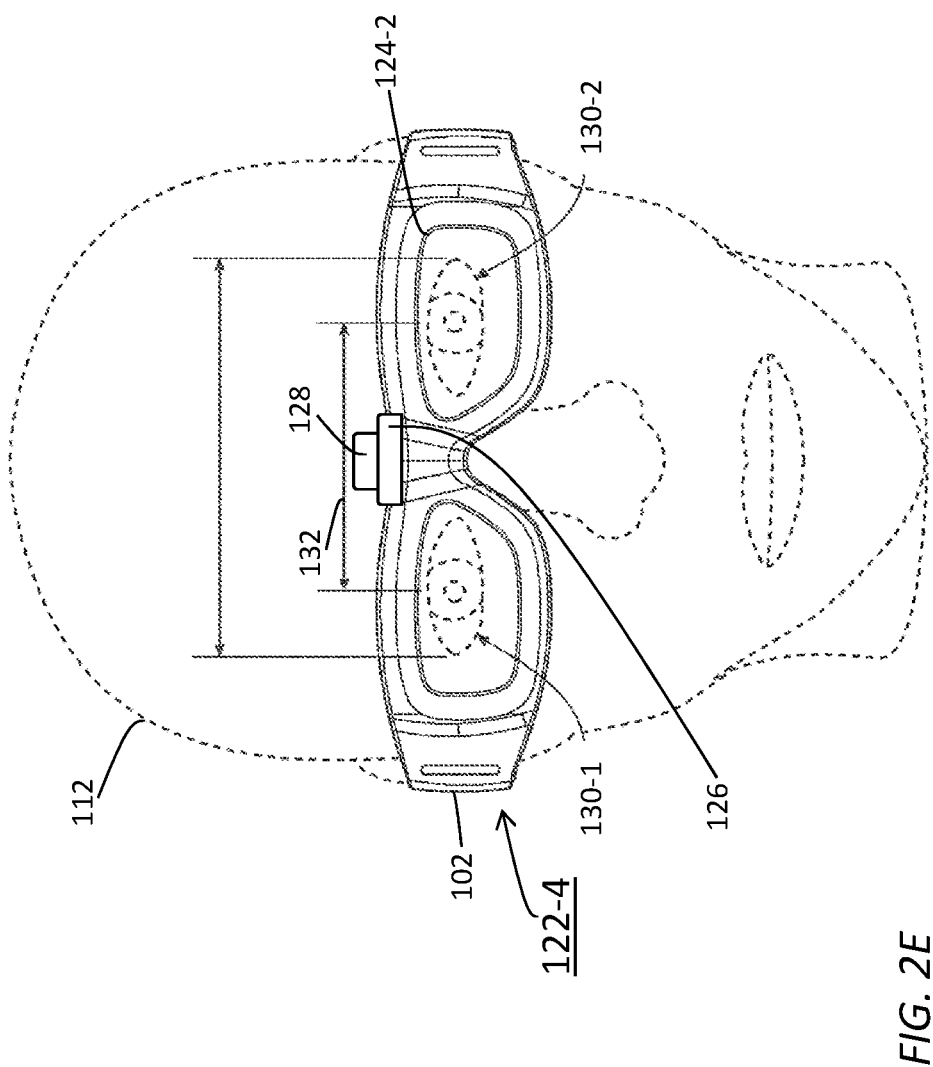

FIG. 2E illustrates a wearable device 122-4 in which a component device is attached to a removably mountable position on another component device of wearable device 122-4.

As illustrated, wearable device 122-4 comprises an imager 126 that is mounted on a first removably mountable position of wearable device 122-4, for example located at the top bar of an eyeglass frame that is used as a mountable physical structure in wearable device 122-4.

In some embodiments, a component device as described herein may comprise zero, one or more removably mountable positions. For example, imager 126 may have been made with a second removably mountable position. A SLAM device (e.g., 128, etc.) may be mounted onto the second removably mountable position of imager 126 to become a part of wearable device 122-4.

FIG. 2F illustrates a wearable device in which a component device is sealed into mountable physical structure 102 of the wearable device. As illustrated, temples 106 of an eyeglass frame may be embedded with component devices. The Component devices may, but is not necessarily limited to only, built-in speakers 138. Built-in speakers 138 may be sealed (e.g., completely, hermetically, etc.) by sealing parts 140 located in the temples of the eyeglass frame. Built-in speakers 138 may be protected by sealing parts 140 from physical contact with liquids or chemical agents while the eyeglass including built-in speakers 138 are subject to device washing processes.

In some embodiments, sealing part 140 may be made of sound transmitting materials 142, such as a rigid material capable of transmitting through acoustic sound in some or all of the entire human audible sound frequencies. The acoustic sound transmitted through sound transmitting materials 142 of sealing parts 140 can be further propagated to a viewer's ears through the head bone structure (which is physical contact with sound transmitting materials 142) of the viewer that wears the wearable device.

Thus, in some embodiments, one or more component devices that are a part of a wearable device may be irremovably (or permanently) incorporated as a part of mountable physical structure as described herein. Component devices that are irremovably incorporated may be built-in speakers, gaze trackers, optical stacks, imagers, SLAM devices, etc.

Additionally, optionally or alternatively, a part of a component device may be irremovably incorporated into the mountable physical structure but the remainder of the component device may be removably mountable to the mountable physical structure directly or indirectly. For example, light waveguides of an imager may be used to receive light rays generated from a light engine of the imager. The light waveguides of the imager may be embedded with the unitary physical structure, whereas other parts of the imager including but not limited to the light engine may be incorporated into a separate removable mountable component device.

Removably mountable positions as described herein may incorporate other functions in addition to mechanical functions of being removably mountable to component devices to be incorporated into wearable devices. In some embodiments, a removably mountable position may incorporate electrical functions (e.g., electrical interfaces, etc.) such as a data connector, etc. For example, once a component device is mounted at the removably mountable position, wired data connections may be effectuated through the data connector between the component device and other component devices. Additionally, optionally or alternatively, the removably mountable position may also incorporate optical functions (e.g., optical interfaces, etc.) such as an optical connector, etc. For example, once a component device is mounted at the removably mountable position, light may be received and/or transmitted through the optical connector between the component device and other component devices.

Under techniques as described herein, a wearable device can be relatively efficiently formed by an end user (e.g., a viewer at a cinema, a viewer at a home entertainment room, a viewer walking in any physical environment, etc.) by adding or removing modular and detachable component devices to the wearable device or a mountable physical structure therein.

One or more component devices—such as one or more of: imagers, SLAM devices, gaze trackers, optical stacks specially configured for outdoor use, optical stacks specially configured to indoor use, optical stacks specially configured for cinema use, optical stacks configured for multiple use (in multiple different physical environments), infrared or non-infrared light sources for device tracking, RF component devices, other electronic parts, and so forth—can be securely (e.g., fittingly, with relatively high spatial precision, etc.), directly or indirectly attached to a mountable physical structure of the wearable device by way of removably mountable positions on the mountable physical structure and on the component devices that have already been assembled by the viewer into the wearable device.

Removably mounted component devices on the wearable device can be removed from the wearable device by the viewer, if the wearable device does not need these component devices for operating in an intended physical environment in which the wearable device is to be used.

As a result, combinations of specific modular and detachable component devices can be respectively assembled and used in different specific intended physical environments. Assembling these component devices into wearable devices can be easily performed by the viewer within relatively short time intervals (e.g., less than one minute, a minute or so, a few minutes, etc.) to form the respectively configured wearable devices suitable for different specific intended physical environments.

In some physical environments such as in a cinema, an indoor place, a home entertainment setting, and so forth, outside-in device tracking can be performed by an external device tracker that tracks images formed by light sources disposed with or on wearable devices. In these environments, relatively bulky SLAM devices that perform inside-out device tracking (as opposed to outside-in device tracking performed with the external device tracker) may be removed/detached, or otherwise made absent, on these wearable devices. As SLAM devices are removed or otherwise absent from the wearable devices in these environments, SLAM devices that are typically bulky and electro-optically complex are not subject to (e.g., rigorous, etc.) device washing processes, liquids or chemical agents. Furthermore, as the wearable devices are tracked by outside-in tracking in these environments, the wearable devices do not need to implement inside-out device tracking and related complex functionality. The wearable devices can incorporate relatively simple components and take up relatively small or less bulky form factors with these simple components, making it easy to handle, assemble, detach, reassemble and wash the wearable devices by viewers or cinema operators that supplying at least parts of the wearable devices to the viewers.

Additionally, optionally or alternatively, the component devices remaining on the wearable devices may be attached to the wearable devices in a way that the component devices (e.g., those with active optical and/or electric components not hermetically sealed, etc.) that are more sensitive to device washing processes are positioned/oriented to have no or minimal contact with hair, skin or fluid of viewers, while the component devices (e.g., those with no optical and/or electric components, with no active optical and/or electric components, or with active optical and/or electric components that are hermetically sealed, etc.) that are not sensitive to device washing processes may be positioned/oriented to have physical contact with viewers to a relatively high degree or extent.

Consider a cinema operator that provides imagers that are shared by viewers at a cinema at different viewing times. These imagers may comprise sensitive electric and/or optic components (e.g., active electric components, active optical components, etc.). Laws and industry guidelines may specify that any devices that have relatively intimate physical contact with hair, skin and fluid of viewers are subject to relatively harsh device washing processes. Each of the imagers shared by multiple viewers may be modularized into a single physical housing and removably attached to a mountable physical structure of one of the wearable devices. The imagers may be positioned/oriented to have no or minimal contact with hair, skin or fluid of viewers to comply with the laws and the industry guidelines. While the parts of the wearable devices that have more intimate physical contact with the viewers are subject to the device washing processes, the imagers may be subject to no or only relatively light washing (e.g., a wipe by a viewer with a wet disposable cloth, etc.), without violating the laws and/or industry guidelines.

Additionally, optionally or alternatively, in some embodiments, personally owned imagers that are used for non-cinema physical environment by viewers can be brought in by the viewers to a device sharing environment such as a cinema for accessing augmented 3D content.

While operating in content consumption environments such as cinemas in which external device trackers are available for tracking wearable devices of the viewers, the external device trackers, rather than SLAM devices which may be absent from the wearable devices, can interoperate with the imagers and/or device image renderers to render images that spatially correctly registered to objects or locations in physical or virtual scenes perceived by the viewers through separate optical stacks (e.g., 124-1 and 124-2, etc.).

While operating in other physical environments in which external device trackers are not available for tracking wearable devices of the viewers, SLAM devices attached to the wearable devices can interoperate with the imagers to render images that spatially correctly registered to objects or locations in physical or virtual scenes perceived by the viewers through separate optical stacks (e.g., 124-3 and 124-4, etc.).

An imager may implement the same imaging engine to communicate with a SLAM device that performs the inside-out tracking or with an external device tracker that performs outside-in tracking. Device tracking data, even some other data generated based at least in part on the device tracking data, may be streamed to the imager from external device tracker(s) or SLAM device(s) depending on whether the external device tracker(s) or SLAM device(s) are present for performing device tracking.

It should be noted that, in various embodiments, external or outside-in device tracking may be used in other physical environments in addition to or in place of cinemas. For example, a home entertainment setting may implement external or outside-in device tracking and provide/stream device tracking data to wearable device(s) present in the home entertainment setting, or imagers and/or other component devices thereof. Hence, techniques as described herein can be used to access and consume augmented content such as augmented 3D content in a variety of physical environments.

8. Device Calibration

As component devices can be attached and removed from a wearable device through removably mountable positions on a mountable physical structure and/or on component devices already attached, these component devices may be positioned and/or oriented with locational error margins (or locational tolerances) relative to a spatial coordinate system that is stationary to the wearable device. For these component devices to be able to operate with relatively high spatial precision (e.g., in terms of position and/or orientation, etc.), calibration operations may be used to determine calibration offsets needed to compensate for these errors.

For example, an imager may be used in a wearable device as described herein to render (component device) display images that are superposed (or superimposed) with cinema or non-cinema images viewed through an optical stack separate from the imager. Depicted objects, depicted persons, and so forth, in the display images should be spatially accurately located or registered at correspond spatial positions and/or orientations in the cinema or non-cinema images, in order to provide a viewer of the wearable device with a relatively high-quality user experience. For example, an apple depicted in the display images should be spatially accurately (e.g., in terms of size, depth, geometric shape, etc.) located or registered at a spatial position and/or orientation such as corresponding to a spatial position and/or orientation of a table depicted in the cinema or non-cinema images.

Additionally, optionally or alternatively, in some content consumption scenarios, the imager may be used to render the display images that are superposed (or superimposed) with physical objects, persons, and so forth, in a physical environment, viewed through an optical stack separate from the imager. Depicted objects, depicted persons, and so forth, in the display images should be spatially accurately located or registered at correspond spatial positions and/or orientations in the physical environment. For example, an apple depicted in the display images should be spatially accurately (e.g., in terms of size, depth, geometric shape, etc.) located or registered at a spatial position and/or orientation such as corresponding to a spatial position and/or orientation of a table in the physical environment.

An imager as described herein may be calibrated using one or more in a variety of AR display device calibration methods. For example, test images (or synthetic images) may be rendered by the imager in a calibration operation or dynamically (e.g., during a VR/AR/MR session, etc.) to determine or measure calibration offsets (e.g., in terms of the number of pixels to be shifted horizontally and/or vertically, an angular degree to be rotated, fractional pixel shifts, etc.) that are needed to spatially accurately depict objects, persons, and so forth, in display images. Additionally, optionally or alternatively, locations or objects (e.g., physical objects, depicted objects, physical fiducial marks, fiducial marks depicted at know locations of a display screen, test image patterns, etc.) that have preset (or known) spatial locations and/or orientations in a physical environment may be used to calibrate and register the imager in the physical environment. The results of calibration and registration may be used to generate the calibration offsets for the imager to compensate any errors in attaching the imager to the wearable device.

Gaze (or eye) trackers as described herein may be calibrated using one or more in a variety of gaze tracker calibration methods. For example, in a cinema, visual stimuli with preset spatial locations may be used to attract a viewer for viewing, while images or sensor data of the viewer's eyes and/or eye movements may be generated and analyzed. The results of calibration may be used to generate calibration offsets for each of the gaze trackers to compensate any errors in attaching the gaze tracker to the wearable device.

A SLAM device as described herein may be calibrated using one or more in a variety of SLAM device calibration methods. For example, in a cinema, spatial locations with preset coordinate values in a coordinate system of a physical environment may be used by the SLAM device to generate locational sensor data, determine/estimate coordinate values of the spatial locations, and compare the estimated coordinate values with the preset coordinate values. The results of calibration or comparison may be used to generate calibration offsets for the SLAM device to compensate any errors in attaching the SLAM device to the wearable device.

Component devices of the same type may have variations in spatial accuracies that are generated in manufacturing processes. In some embodiments, factory-set calibration offsets may be generated by device calibration of a component device that are performed at factory. The factory-set calibration offsets may be stored with the component device or at a server. The component device may be removably mounted into a wearable device for an VR/AR/MR session in a content consumption environment. Because of tolerance and slight movements in attaching the component to a corresponding removably mountable point on the wearable device, the factory-set calibration offsets may be invalidated. At the beginning of and/or throughout the VR/AR/MR session, spatial device calibration may be performed to generate non-factory calibration offsets. The non-factory calibration offsets may be used to replace or combine with the factory-set calibration offsets into effective calibration offsets to be used for actual device operations in the wearable device. For example, as an imager is attached into the wearable device, positional and/or orientation errors may be introduced in light projection or in a light waveguide to cause pixel shifted or rotated from correct locations. Due to the positional and/or orientation errors, the imager may inject or direct light intended for a micro-optical fiber (in the light waveguide) corresponding to a specific pixel location to a different micro-optical fiber (in the light waveguide) corresponding to a different pixel location. The effective calibration offsets may be used to correct these positional and/or orientation errors and enable the imager to display images with depicted objects registered at correct spatial locations.

In some embodiments, some or all of component devices of a wearable device as described herein may perform their respective spatial device calibration operations independently and autonomously. For example, each of these component devices may perform its respective spatial device calibration operations independently and autonomously without any need to exchange state or information related to device calibration operations with other component devices.

In some embodiments, some or all of component devices of a wearable device as described herein may perform their respective spatial device calibration operations jointly and cooperatively. These component devices may exchange state or information related to device calibration operations with other component devices. In a non-limiting example, a SLAM device may pass coordinate values of a physical object in a physical environment to other component devices such as gaze trackers for the gaze trackers to generate calibration offsets to be used in determining or estimating viewing directions of eyes of a viewer. In another non-limiting example, an imager and a gaze tracker may synchronize their respective calibration offsets in a way that a viewing direction of an eye of the viewer as determined by the gaze tracker can be efficiently and accurately mapped to a specific location such as a pixel position on a device display associated with the imager.

In some embodiments, some or all of the component devices that form the wearable device may be attached to a mountable physical structure in any order by a viewer or an operator. Each of some or all of the component devices may comprise its respective processing engine that supports some or all of spatial device calibration operations as described herein. The respective processing engine of the component device may be configured to detect whether the component device is currently (e.g., securely, operationally, etc.) attached the wearable device.

In cases where the component device implements a device calibration controller, in response to detecting that the component device itself is securely attached into the wearable device, the component device, or the device calibration controller therein, may identify types of some or all other component devices currently (e.g., securely, operationally, etc.) attached the wearable device and select a method for calibrating and/or registering the attached component devices of the wearable device.

In cases where the component device does not implement a device calibration controller, in response to detecting that the component device is securely attached into the wearable device, the component device, or the processing engine therein, may send out a device attachment signal to some or all of the other component devices that are currently attached to the wearable device. The device attachment signal may be sent through wired data connections (e.g., a data bus, an interconnect, a data connection cross bar, etc.), or through wireless data connections. The device attachment signal may send periodically on a linear or logarithmic time scale until a component device that is assigned to be the device calibration controller responds to the device attachment signal.

A number of methods may be available for selection by the wearable device for calibrating and/or registering the attached component devices of the wearable device.

One or more communication mechanisms used in component device calibrations and/or registrations can also be used in actual operations (for consuming VR/AR/MR content). For example, viewing directions as determined by gaze trackers can be passed through the communication mechanisms to imagers. In some embodiments, the imagers may render image portions or depicted objects, to which a viewer is currently directing the view directions, with relatively high acuity. The viewing directions may also be provided to a SLAM device or an external device tracker to generate 3D mapping information with relatively high resolutions for spatial locations corresponding to the viewing directions. The 3D mapping information may be provided to the imager. Based at least in part on the 3D map information, the imager may spatially accurately render and register depicted objects in component device display images at correct spatial locations as if the depicted objects is a natural part (e.g., a depicted apple as if it were on a physical table with correct size, direction, geometry, etc.) of a physical environment as represented by the 3D mapping information.

Offsets generated in device calibration may be cached or stored in memory (e.g., registers, cache memory, RAM, ROM, flash memory, etc.)

Figure 3A:
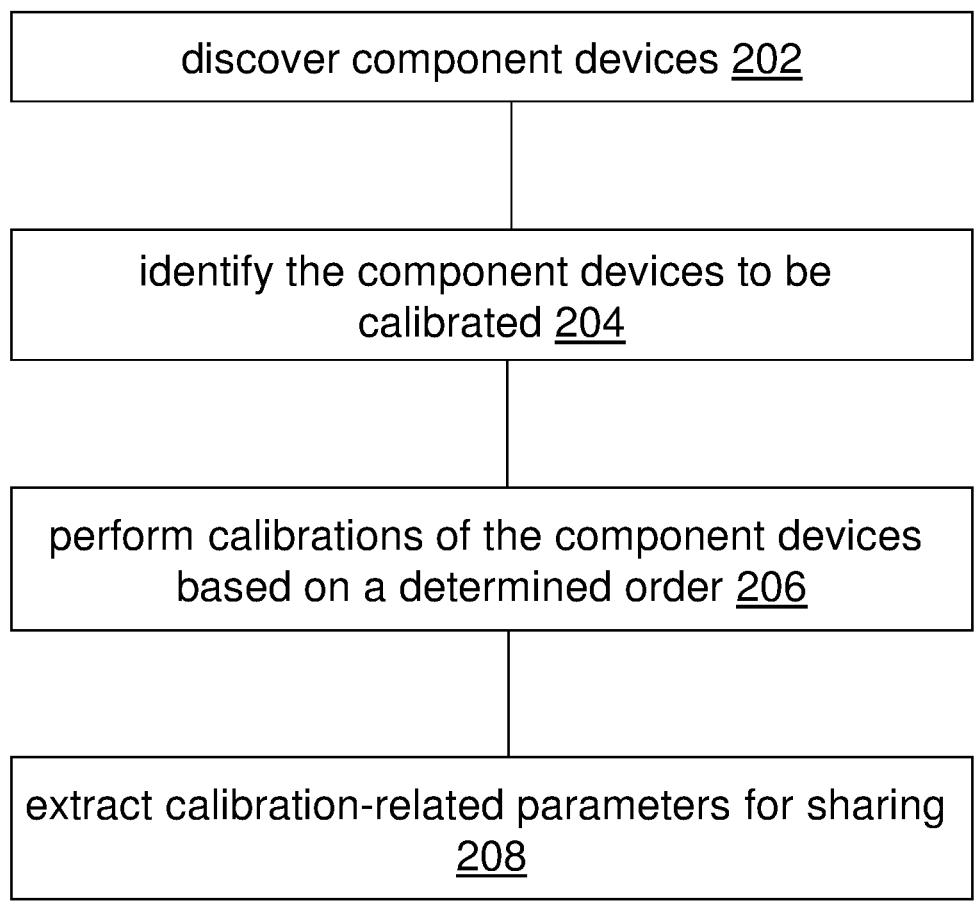
FIG. 3A and FIG. 3B illustrate example process flows for device calibration of component devices in wearable devices.

FIG. 3A illustrates an example process flow for device calibration of component devices in a wearable device.

A process flow as described herein may be carried out based on a master-agent model. The wearable device may comprise a device calibration controller (implemented by software, hardware, or a combination of software and hardware) causes the performance of some or all of the process flow. The device calibration controller may be implemented with a single component device (e.g., a master component device, etc.) such as an imager, a gaze tracker, a SLAM device, and so forth. Other component devices such as agent component devices may implement a device calibration agent (implemented by software, hardware, or a combination of software and hardware) that communicates and operates with the device calibration controller in the master component device to carry out device calibration operations in a cooperatively and/or semantically correct manner. In some embodiments, the role of the device calibration controller may be statically assigned to a specific type of component device. For example, an imager may be preconfigured with the device calibration controller. In some embodiments, the device calibration controller may be dynamically assigned to a specific component device, for example through device negotiation protocol operations, through device election protocol operations, through device discovery protocol operations, by the time order in device attachment times, by the numerical order in device-related IDs, etc.

Additionally, optionally or alternatively, a process flow as described herein may be carried out based on a peer-to-peer model. The wearable device may implement a distributed device calibration controller with some or all of the component devices of the wearable devices. The component devices communicate and operate with one another to carry out device calibration operations of the component devices in a cooperatively and/or semantically correct manner. As used herein, the term "a device calibration controller" may refer to a device calibration controller that is implemented by a single component device or by a group of component devices collectively.

In block 202, the wearable device, or the device calibration controller therein, discovers component devices that are removably mounted to form the wearable device, for example through a device discovery protocol supported by the component devices.

In block 204, the wearable device identifies the component devices that are to be calibrated. In some embodiments, a component device that is to be calibrated may set a calibration indicator such as a data field value, a specific semaphore, a specific data flag, and so forth, to indicate that the component device is a component device to be calibrated. The calibration indicator may be made accessible to the device calibration controller.

For example, as the component device is inserted into the wearable device, the component device, or a processing engine therein, may enter a device initialization state in which the component device sets the calibration indicator to indicate a need for calibrating the (e.g., just inserted, etc.) wearable device. In response to receiving the calibration indicator, the device calibration controller identifies that the component device is one of one or more component devices of the wearable device that are to be calibrated.

In block 206, the wearable device determines an order for calibrating these component devices, and performs calibrations of the component devices based on the determined order.

In some embodiments, each of some or all of the component devices that are to be calibrated may be calibrated independently or autonomously, for example in parallel or in any order. In some embodiments, some or all of these component devices may be calibrated in a sequence. For example, if component devices A and B both are present in the wearable device and if component device A depends on component device B (e.g., an imager depending on gaze tracker for viewing directions, a gaze tracker depending on a SLAM device or an external device tracker for coordinate values, etc.), then the component device that is depended on, in the present example component device B, may be calibrated first, followed by the component device that depends on the other component device. For instance, in some embodiments, the SLAM device or the external device tracker may be calibrated before the gaze tracker. In a cinema in which device tracking is performed by an external device tracker, the external device tracker may be calibrated before all wearable devices and (additionally, optionally or alternatively) may be further calibrated.

Additionally, optionally or alternatively, some or all of the component devices that are to be calibrated may be calibrated cooperatively together for example in a peer-to-peer model. Available device calibration results or default calibration parameters may be exchanged through the controller or from peer to peer.

In block 208, the wearable device, or the device calibration controller therein, receives and/or extracts zero, one or more calibration-related parameters for sharing among some or all of the component devices or other devices operating in conjunction with the wearable device.

In an example, an image renderer may be implemented by the wearable device or by an external device outside the wearable device. The image renderer may receive calibration offsets of an imager of the wearable device and/or calibration related parameters, generate (component device) display images, and transforms (e.g., shifts, rotates, scales, etc.) the display images based at least in part on the calibration offsets and/or calibration related parameters. The transformed display images may be provided to the imager for rendering.

In another example, the device calibration controller of the wearable device may receive calibration related parameters such as calibration offsets extracted from a SLAM device or an external device tracker. While an imager or another component device receives coordinate values from the SLAM device or the external device in device calibration or in normal operations, these calibration related parameters or calibration offsets may be used to adjust the received coordinate values to calibrated coordinate values.

Figure 3B:
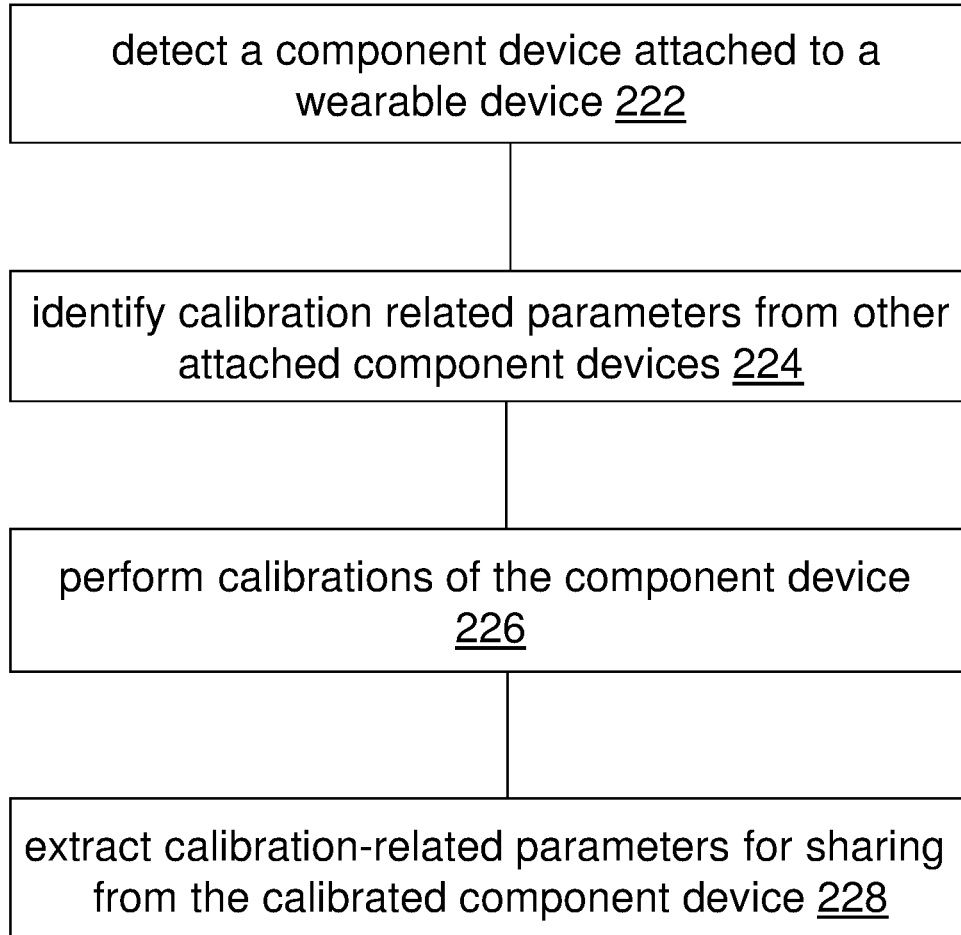

FIG. 3B illustrates an example process flow for device calibration of component devices in a wearable device. A process flow as described herein may be carried out based on a master-agent model or based on a peer-to-peer model.

In block 222, the wearable device detects that a component device is attached to the wearable device. The detection may be made by a system configuration/reconfiguration controller of the wearable device, by a device calibration controller of the wearable device, etc.

In block 224, the wearable device identifies zero, one or more calibration related parameters from other already attached component devices of the wearable device that are already calibrated. This may be determined at least in part based on a type of the component device to be calibrated. Any identified calibration related parameters that are needed by the component device may be extracted from the other already attached component devices and passed to the component devices to be calibrated.

In block 226, the wearable device causes the component device to be calibrated.

In block 228, the wearable device identifies zero, one or more calibration-related parameters for sharing from the calibrated component device, extracts these calibration-related parameters from the calibrated component devices, and shares these parameters with other component devices of the wearable devices.

9. Example Process Flows

Figure 4:
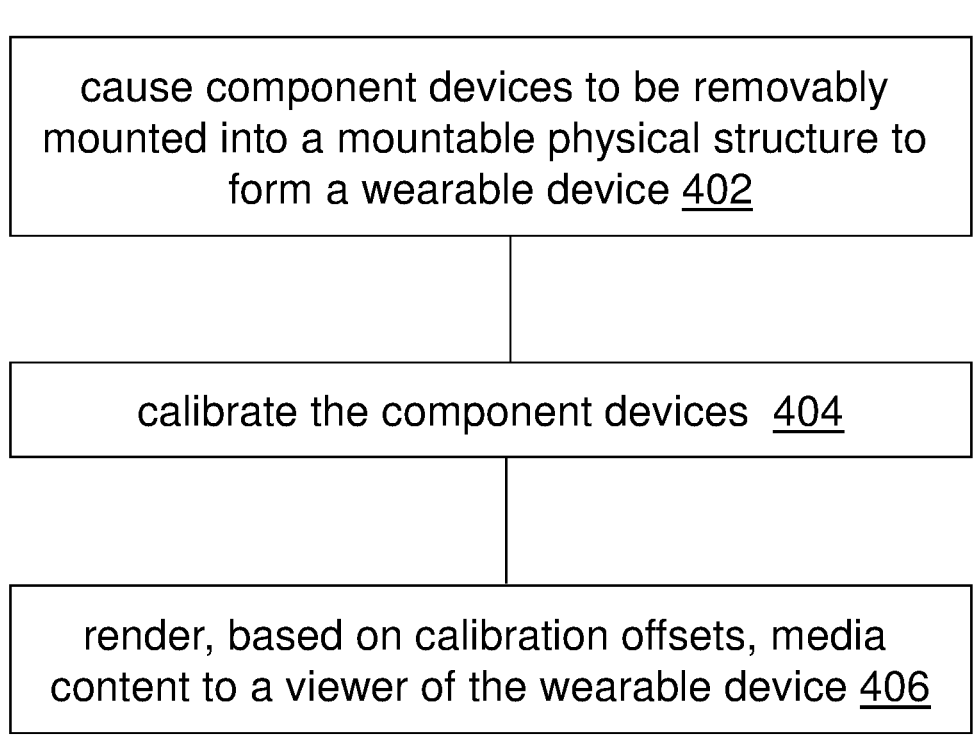
FIG. 4 illustrates an example process flow.

FIG. 4 illustrates an example process flow according to an example embodiment of the present invention. In some example embodiments, one or more computing devices or components may perform at least some of this process flow. In block 402, one or more component devices caused to be removably mounted into a mountable physical structure to form a wearable device to be used in a specific type of content consumption environment. The one or more component devices are mounted into one or more removably mountable positions of the mountable physical structure with one or more actual locational errors within one or more locational error margins.

In block 404, the one or more component devices are calibrated to generate calibration offsets to compensate for the one or more actual locational errors within the one or more locational error margins.

In block 406, media content is rendered, based at least in part on the calibration offsets, to a viewer of the wearable device.

In an embodiment, a master-agent model is used to calibrate the one or more component devices.

In an embodiment, a peer-to-peer model is used to calibrate the one or more component devices.

In an embodiment, at least one of the one or more component devices is calibrated autonomously and independently from calibrating all other component devices in the one or more component devices.

In an embodiment, one or more first calibration offsets of a first component device in the one or more component devices are used to generate one or more second calibration offsets of a second different component device in the one or more component devices.

In an embodiment, the one or more component devices are calibrated time-wise sequentially.

In an embodiment, the one or more component devices comprise an imager used to render component device display images; one or more calibration offsets of the imager are used to register objects depicted in the component device display images spatially accurately with other objects depicted in other display images generated by a display system other than the wearable device.

In an embodiment, the one or more component devices comprise an imager used to render component device display images; one or more calibration offsets of the imager are used to register objects depicted in the component device display images spatially accurately with physical objects in a physical scene.

In an embodiment, a wearable device for augmented media content experiences comprises: a mountable physical structure that has one or more removably mountable positions; one or more component devices that are removably mounted through the one or more removably mountable positions. The one or more component devices are specifically selected based on a specific type of content consumption environment in which the wearable device is to operate. The mountable physical structure is subject to a device washing process to which the one or more component devices are not subject to, after the wearable device including the mountable physical structure and the one or more component devices is used by a viewer in a content consumption session in the specific type of content consumption environment so long as the one or more component devices are subsequently removed from the mountable physical structure after the content consumption session.

In an embodiment, each component device, of the one or more component devices, represents a modular device enclosed in a respective physical housing dedicated to each such component device.

In an embodiment, the mountable physical structure has an external surface on which a set of light sources is located; light from the set of light sources is used for outside-in device tracking by an external device tracker present in the specific type of content consumption environment.

In an embodiment, each component device in the one or more component devices is removable from the mountable physical structure and is mountable to a different mountable physical structure to form a different wearable device.

In an embodiment, the different wearable device is to operate in one of: the specific content consumption environment, one or more content consumption environments different from the specific content consumption environment, and so forth.

In an embodiment, the mountable physical structure is provided by an operator of a mass entertainment venue; the mountable physical structure is to be washed in the device washing process in accordance with laws or industry regulations; the device washing process is to include use of one or more of: liquids, chemical agents, pressures, movements, and so forth.

In an embodiment, the mountable physical structure is free of electronic components that are susceptible to damage in the device washing process and that are not insulated from physical contact with liquid.

In an embodiment, the mountable physical structure is free of optical components that are susceptible to damage in the device washing process and that are not insulated from physical contact with liquid.

In an embodiment, at least one of the one or more component devices comprises electronic components that are susceptible to damage in the device washing process and that are not insulated from physical contact with liquid.

In an embodiment, at least one of the one or more component devices comprises optical components that are susceptible to damage in the device washing process and that are not insulated from physical contact with liquid.

In an embodiment, at least one of the one or more component devices is subject to a second device washing process different from the device washing process.

In an embodiment, the device washing process is specifically designed to allow the mountable physical structure to be used for a second different wearable device of a second different viewer in the specific type of content consumption environment.

In an embodiment, a component device of the one or more component devices is mounted to a removably mountable position of the one or more removably mountable positions; the removably mountable position is free of any electric or optical interface.

In an embodiment, a component device of the one or more component devices is mounted to a removably mountable position of the one or more removably mountable positions; the removably mountable position comprises an optical interface to the component device.

In an embodiment, the one or more component devices include one or more of: optical stacks to view physical scenes, optical stacks to view images rendered by display systems external to the wearable device, imagers for the wearable device to render component device display images, simultaneous location and mapping devices, eye tracking devices, and so forth.

In an embodiment, the specific type of content consumption environment represents one of: a cinema-based content consumption environment, a home-based content consumption environment, an outdoor content consumption environment, and so forth.

In an embodiment, the wearable device comprises optical stacks that are used to view three-dimensional images rendered by a display system other than the wearable device.

In an embodiment, the optical stacks are irremovably built into the wearable device.

In an embodiment, the optical stacks are clipped onto the wearable device.

In an embodiment, each of the one or more component devices comprises its own electric power source.

In an embodiment, a component device in the one or more component devices generates image rendering light that is optically routed into another component device in the wearable device.

In an embodiment, all of the one or more component devices are interconnected wirelessly.

In an embodiment, at least two of the one or more component devices are electrically or optically interconnected using electric or optical interfaces provided by the one or more removably mountable positions.

In an embodiment, the one or more component devices are to be calibrated to generate non-factory calibration offsets after the one or more component devices are removably mounted into the mountable physical structure of the wearable device by a viewer of the wearable device.

In an embodiment, the wearable device comprises a further component device that is removably mounted to a removably mountable position of a component device in the one or more component devices.

In an embodiment, the wearable device comprises one or more audio speakers that transmit sounds through the viewer's bone structure.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
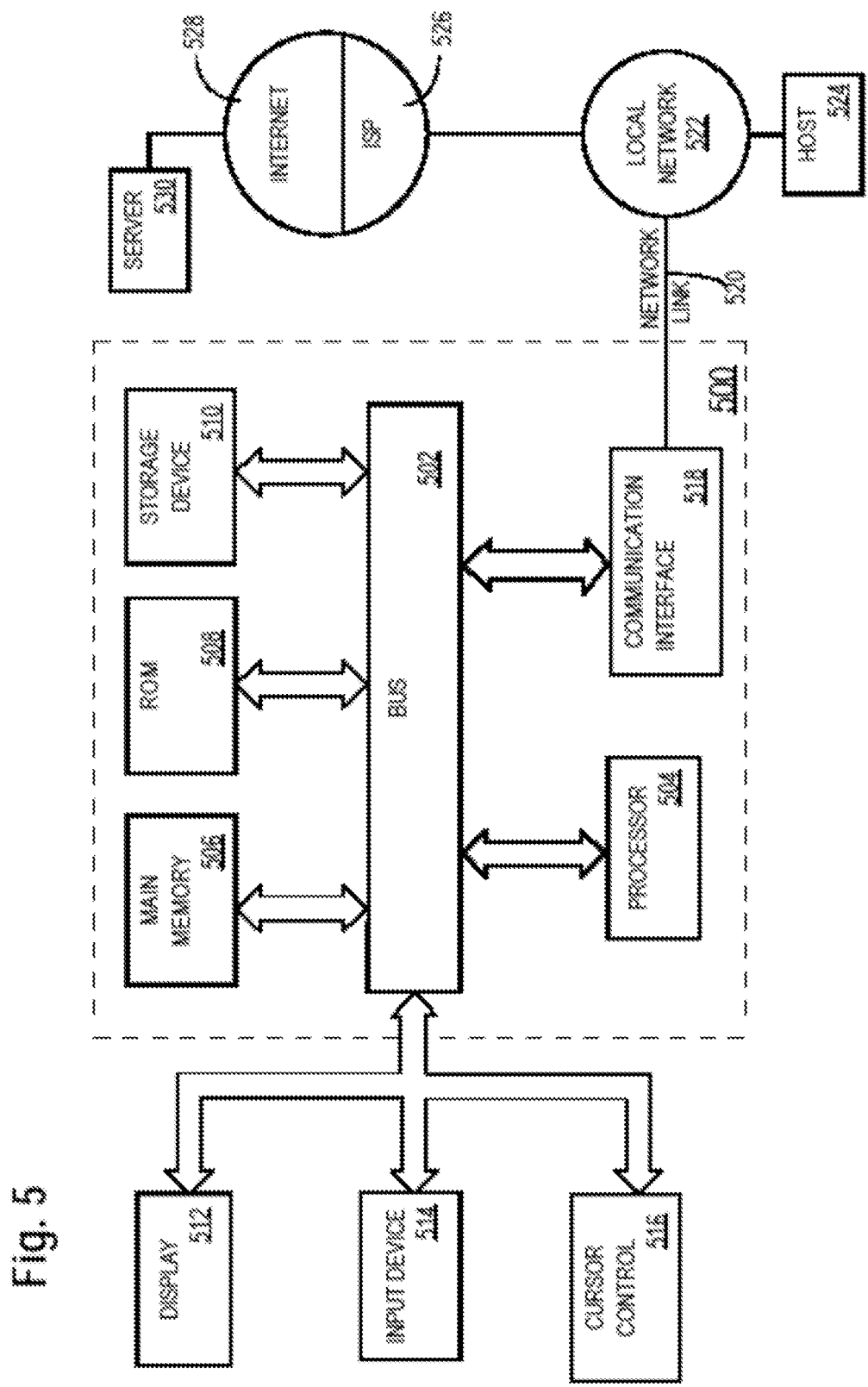
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

11. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A wearable device for augmented media content experiences, comprising:
    a mountable physical structure that has two or more removably mountable positions;
    two or more component devices that are removably mounted through the two or more removably mountable positions;
    wherein the two or more component devices comprise one or more imagers for the wearable device to render device display images;
    wherein the mountable physical structure is subject to a device washing process to which the two or more component devices are not subject to, after the wearable device including the mountable physical structure and the two or more component devices is used by a viewer in a content consumption session in the specific type of content consumption environment so long as the two or more component devices are subsequently removed from the mountable physical structure after the content consumption session.

2. The wearable device of claim 1, wherein each component device, of the two or more component devices, represents a modular device enclosed in a respective physical housing dedicated to each such component device.

3. The wearable device of claim 1, wherein the mountable physical structure has an external surface on which a set of light sources is located, and wherein light from the set of light sources is used for outside-in device tracking by an external device tracker.

4. The wearable device of claim 1, wherein each component device in the two or more component devices is removable from the mountable physical structure and is mountable to a different mountable physical structure to form a different wearable device.

5. The wearable device of claim 1, wherein the mountable physical structure is provided by an operator of a mass entertainment venue, wherein the mountable physical structure is to be washed in the device washing process in accordance with laws or industry regulations, and wherein the device washing process is to include use of two or more of: liquids, chemical agents, pressures, or movements.

6. The wearable device of claim 1, wherein the mountable physical structure is free of electronic components that are susceptible to damage in the device washing process and that are not insulated from physical contact with liquid.

7. The wearable device of claim 1, wherein the mountable physical structure is free of optical components that are susceptible to damage in the device washing process and that are not insulated from physical contact with liquid.

8. The wearable device of claim 1, wherein at least one of the two or more component devices comprises electronic or optical components that are susceptible to damage in the device washing process and that are not insulated from physical contact with liquid.

9. The wearable device of claim 1, wherein the two or more component devices include one or more of: optical stacks to view physical scenes, optical stacks to view images rendered by display systems external to the wearable device, simultaneous location and mapping devices, or eye tracking devices.

10. The wearable device of claim 1, wherein the wearable device comprises optical stacks that are used to view three-dimensional images rendered by a display system other than the wearable device.

11. The wearable device of claim 1, wherein a component device in the two or more component devices generates image rendering light that is optically routed into another component device in the wearable device.

12. The wearable device of claim 1, wherein the two or more component devices are interconnected wirelessly.

13. The wearable device of claim 1, wherein at least two of the two or more component devices are electrically or optically interconnected using electric or optical interfaces provided by the two or more removably mountable positions.

14. The wearable device of claim 1, wherein the two or more component devices are to be calibrated to generate non-factory calibration offsets after the two or more component devices are removably mounted into the mountable physical structure of the wearable device by a viewer of the wearable device.

15. The wearable device of claim 1, wherein the wearable device comprises a further component device that is removably mounted to a removably mountable position of a component device in the two or more component devices.

16. The wearable device of claim 1, wherein the wearable device comprises one or more audio speakers that transmit sounds through the viewer's bone structure.

17. A method of providing a wearable device for augmented media content experiences, comprising:
    determining two or more component devices to be mounted to the wearable device, wherein the two or more component devices comprise one or more imagers for the wearable device to render device display images;
    wherein the wearable device comprises a mountable physical structure that has two or more removably mountable positions;
    using the two or more removably mountable positions of the mountable physical structure to removably mount the two or more component devices;
    wherein the mountable physical structure is subject to a device washing process to which the two or more component devices are not subject to, after the wearable device including the mountable physical structure and the two or more component devices is used by a viewer in a content consumption session in the specific type of content consumption environment so long as the two or more component devices are subsequently removed from the mountable physical structure after the content consumption session.

18. The wearable device of claim 17, wherein each component device, of the two or more component devices, represents a modular device enclosed in a respective physical housing dedicated to each such component device.

19. The wearable device of claim 17, wherein the mountable physical structure has an external surface on which a set of light sources is located, and wherein light from the set of light sources is used for outside-in device tracking by an external device tracker present in the specific type of content consumption environment.

20. The wearable device of claim 17, wherein at least one of the two or more component devices comprises electronic or optical components that are susceptible to damage in the device washing process and that are not insulated from physical contact with liquid.

* * * * *